US012410968B2

(12) United States Patent
Cui et al.

(10) Patent No.: US 12,410,968 B2
(45) Date of Patent: Sep. 9, 2025

(54) DOOR ASSEMBLY AND REFRIGERATION DEVICE

(71) Applicants: HEFEI MIDEA REFRIGERATOR CO., LTD., Anhui (CN); HEFEI HUALING CO., LTD., Anhui (CN); MIDEA GROUP CO., LTD., Guangdong (CN)

(72) Inventors: Xiangqian Cui, Anhui (CN); Ronghai Chen, Anhui (CN); Ruiqin Zhang, Anhui (CN); Weihao Xie, Anhui (CN); Yuan Sun, Anhui (CN); Tao Chen, Anhui (CN); Ming Yang, Anhui (CN); Yanshi Zhao, Anhui (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 183 days.

(21) Appl. No.: 18/004,037

(22) PCT Filed: Dec. 31, 2021

(86) PCT No.: PCT/CN2021/143758
§ 371 (c)(1),
(2) Date: Dec. 30, 2022

(87) PCT Pub. No.: WO2022/227682
PCT Pub. Date: Nov. 3, 2022

(65) Prior Publication Data

US 2023/0272965 A1 Aug. 31, 2023

(30) Foreign Application Priority Data

Apr. 30, 2021 (CN) ......................... 202110482384.5
Apr. 30, 2021 (CN) ......................... 202110482385.X
(Continued)

(51) Int. Cl.
*F25D 23/02* (2006.01)
*E05F 15/611* (2015.01)

(52) U.S. Cl.
CPC .......... *F25D 23/028* (2013.01); *E05F 15/611* (2015.01); *F25D 2323/021* (2013.01)

(58) Field of Classification Search
CPC ............. F25D 23/028; F25D 2323/021; F25D 23/087; F25D 11/02; F25D 2323/023;
(Continued)

(56) References Cited

U.S. PATENT DOCUMENTS 5,425,205 A * 6/1995 Ha ........................ E05C 19/028
49/306
10,697,693 B2 * 6/2020 Lee ......................... F25D 11/00
(Continued)

FOREIGN PATENT DOCUMENTS

CN 103673478 A 3/2014
CN 107614991 A 1/2018
(Continued)

*Primary Examiner* — Hiwot E Tefera
(74) *Attorney, Agent, or Firm* — K&L Gates LLP

(57) ABSTRACT

The present application relates to the field of refrigeration, and provides door assembly and refrigeration equipment. The door assembly includes: a door leaf, including a first door body and a second door body, where the first door body is configured to be rotatably connected to an installation part, and the second door body is configured to move toward an opening side or a hinged side of the first door body with respect to the first door body to switch between a sealing position and an avoidance position; the door leaf is config-
(Continued)

ured to switch between a closing state in which the second door body is in the sealing position and an opening state; the second door body is in the avoidance position when the door leaf is switched between the closing state and the opening state. When the door leaf is in a closing state, the second door body is in the sealing position to ensure the sealing effect of the door leaf. When the door leaf needs to be opened or closed, the second door body is in the avoidance position to prevent the movement of the door leaf from being interfered. When the door assembly is applied to a refrigerator, the dependence of a traditional refrigerator on a flipping beam can be changed, and the defect of inflexible division of storage space of a box body can be avoided.

20 Claims, 16 Drawing Sheets

(30) Foreign Application Priority Data

| | | |
|---|---|---|
| Apr. 30, 2021 | (CN) | 202110482395.3 |
| Apr. 30, 2021 | (CN) | 202110485066.4 |
| Apr. 30, 2021 | (CN) | 202110485464.6 |

(58) Field of Classification Search

CPC ...... F25D 21/04; F25D 2324/021; E06B 7/16; E05Y 2800/12; E05C 19/161; E05F 15/611

See application file for complete search history.

(56) References Cited

U.S. PATENT DOCUMENTS

| | | | | |
|---|---|---|---|---|
| 2007/0257589 A1* | 11/2007 | Laible | F25D 23/02 | 312/405 |
| 2014/0145576 A1* | 5/2014 | White | E05F 1/1253 | 312/319.1 |
| 2018/0299185 A1* | 10/2018 | Yi | F25D 23/02 | |

FOREIGN PATENT DOCUMENTS

| | | | | | |
|---|---|---|---|---|---|
| CN | 108375259 | A | | 8/2018 | |
| CN | 111649524 | A | | 9/2020 | |
| CN | 112444090 | A | | 3/2021 | |
| CN | 112964013 | A | | 6/2021 | |
| CN | 113154776 | A | | 7/2021 | |
| DE | 102016203323 | | * | 9/2017 | |
| DE | 102017001181 | | * | 5/2018 | |
| KR | 100657496 | B1 | * | 12/2006 | |
| KR | 2006125272 | A | * | 12/2006 | E06B 7/20 |
| KR | 100747578 | B1 | * | 8/2007 | |
| WO | WO-9103616 | A1 | * | 3/1991 | |
| WO | WO-2019007832 | A1 | * | 1/2019 | F25D 23/02 |
| WO | WO-2020139220 | A1 | * | 7/2020 | E05B 47/026 |

* cited by examiner

DOOR ASSEMBLY AND REFRIGERATION DEVICE

CROSS-REFERENCE TO RELATED APPLICATION

The present application claims priority to Chinese Patent Application No. 2021104823953, filed on Apr. 30, 2021, entitled "Door Assembly and Refrigeration Equipment", to Chinese Patent Application No. 2021104823845, filed on Apr. 30, 2021, entitled "Door Assembly and Refrigeration Equipment", to Chinese Patent Application No. 2021104850664, filed on Apr. 30, 2021, entitled "Door Assembly and Refrigeration Equipment", to Chinese Patent Application No. 2021104854646, filed on Apr. 30, 2021, entitled "Door Assembly and Refrigeration Equipment" and to Chinese Patent Application No. 202110482385X, filed on Apr. 30, 2021, entitled "Door Assembly and Refrigeration Equipment", which are hereby incorporated by reference in their entities.

TECHNICAL FIELD

The present application relates to the field of refrigeration technologies, and in particular, to a door assembly and refrigeration equipment.

BACKGROUND

Referring to a side-by-side refrigerator, a door leaf is closed by rotating a shaft sleeve and a shaft hole provided on the door leaf and a box body. In order to prevent movement interference between door leaves of a double door during the rotation of opening and closing door, a seam ranging from 4 mm to 10 mm will be designed between the two door leaves when the door leaves are closed. The design of the gap will not only cause leakage of cold air, but also affect the appearance of the refrigerator. In view of this, the related art provides the following solutions to solve the above problems.

A special flipping beam structure is added to avoid the leakage of cold air, but the addition of the flipping beam will lead to the problem that the door cannot be closed smoothly due to the collision of the flipping beam with another door body caused by misoperation when closing the door.

Alternatively, a door seal can be provided at a door seam between the two door leaves to prevent the leakage of cold air within the refrigerator. However, it is poor in effect to seal the door seam of the refrigerator only relying on the fit of the door seal. In order to ensure the sealing effect of the door seal, a solution is proposed to divide the compartment of the refrigerator by using a partition plate and make the door seal and the partition plate fit together to improve the sealing performance. However, the arrangement of the partition plate tends to reduce the effective volume ratio of the side-by-side refrigerator, and this arrangement also makes it impossible to store large-volume objects inside the refrigerator, which has reduced the flexibility of placing items in the refrigerator.

Moreover, none of the above solutions can eliminate the seam between the two door leaves and make the appearance of the refrigerator more aesthetic.

SUMMARY

The present application solves at least one of the problems in the related art. The present application provides a door assembly, which can eliminate a seam on an opening side of a door leaf in a closing state. When the door assembly is applied to a double door, the seam between door leaves oppositely arranged in the closing state can be reduced or even completely eliminated, and the door assembly is easy to be operated, and this door assembly has no adverse effect on the division of the corresponding interior space and space utilization rate.

The present application further provides refrigeration equipment.

According to an embodiment of the present application, a door assembly is provided, which includes:

- a door leaf, including a first door body and a second door body, where the first door body is configured to be rotatably connected to an installation part, and the second door body is configured to move toward an opening side or a hinged side of the first door body with respect to the first door body to switch between a sealing position and an avoidance position; and
- the door leaf is configured to switch between a closing state in which the second door body is in the sealing position and an opening state; the second door body is in the avoidance position when the door leaf is switched between the closing state and the opening state.

According to the door assembly of embodiments of the present application, the door leaf includes a first door body and a second door body, and the second door body can move with respect to the first door body. When the door leaf is in a closing state, in order to ensure the sealing effect of the door leaf, the second door body is moved to the sealing position or remains in the sealing position. When the door leaf needs to be opened or closed, in order to prevent the movement of the door leaf from being interfered, the second door body is moved to the avoidance position or remains at the avoidance position. When this door assembly is applied to a refrigerator, the dependence of a traditional refrigerator on a flipping beam can be changed, and the defect of inflexible division of storage space caused by a partition plate provided in a box body can be avoided.

According to an embodiment of the present application, a drive member is provided between the first door body and the second door body, and the drive member is configured to drive the second door body to move toward the opening side and/or the hinged side of the first door body corresponding to the second door body.

According to an embodiment of the present application, the drive member includes a rotary motor installed on the first door body, the first door body is provided with a screw rod, the second door body is provided with a nut, and an output shaft of the rotary motor is connected to the screw rod to drive the nut to make linear motion along the screw rod; or, the drive member includes a linear motor installed on the first door body, the first door body is provided with a sliding rail, the second door body is provided with a sliding block, and an output shaft of the linear motor is connected to the sliding block to drive the sliding block to make linear motion along the sliding rail.

According to an embodiment of the present application, the drive member includes a first electromagnet provided on the first door body and/or the second door body, and the first electromagnet includes a power-on state in which a magnetic field is generated in the first electromagnet, and the second door body is switched between the sealing position and the avoidance position under the action of the magnetic field, and a power-off state.

According to an embodiment of the present application, the door assembly is a side-by-side door assembly, and the door leaf include oppositely arranged side-by-side door leaves;

the drive member includes a second electromagnet provided on an opening side of the second door body, and the second electromagnet includes a power-on state and a power-off state; the second electromagnets of the oppositely arranged side-by-side door leaves interact with each other in the power-on state, and thus the second door bodies of the oppositely arranged side-by-side door leaves move towards each other or away from each other.

According to an embodiment of the present application, a first elastic reset member is connected between the second door body and the first door body;

the drive member drives the second door body to move to the avoidance position during the switching of the door leaf between the closing state and the opening state; in the closing state, the first elastic reset member drives the second door body to move to the sealing position; or, in the closing state, the drive member drives the second door body to move to the sealing position; the first elastic reset member drives the second door body to move to the avoidance position during the switching of the door leaf between the closing state and the opening state.

According to an embodiment of the present application, there is a plurality of the first elastic reset members distributed along a height direction of the door leaf.

According to an embodiment of the present application, the first door body is configured to be connected to the mounting part through a cam hinge, and the second door body is provided with a drive portion being in contact engagement with the cam hinge;

during the switching of the door leaf from the closing state to the opening state, the drive portion rotates with respect to the cam hinge and a distance between the drive portion and an axis of the cam hinge becomes smaller, and thus the second door body moves toward the hinged side of the first door body with respect to the first door body.

According to an embodiment of the present application, it further includes:

- a second elastic reset member, connected between the first door body and the second door body along a moving direction of the second door body with respect to the first door body;
- in the closing state, the distance reaches a maximum distance value, and the second elastic reset member is deformed; the distance gradually decreases under the action of the restoring force of the second elastic reset member during the switching of the door leaf from the closing state to the opening state.

According to an embodiment of the present application, there is a plurality of the second elastic reset members distributed along the height direction of the door leaf.

According to an embodiment of the present application, the cam hinge includes a hinge shaft and a cam fixed to the hinge shaft, and the cam includes an involute surface engaged with the drive portion.

According to an embodiment of the present application, the drive portion is a stopper fixed on a hinged side of the second door body, and the stopper is in contact engagement with the involute surface.

According to an embodiment of the present application, an elastic sealing layer is provided on an opening side of the second door body.

According to an embodiment of the present application, the first door body is located in the second door body, and a passage extending along a thickness direction of the door leaf is formed between the opening side of the first door body and the opening side of the second door body.

According to an embodiment of the present application, it further includes:

- heat-insulation airbags, provided in the passage and along the moving direction of the second door body with respect to the first door body, where a first end of each of the heat-insulation airbags is connected to the first door body, and a second end of each of the heat-insulation airbag is connected to the second door body;
- the heat-insulation airbag is stretched in the closing state; and the heat-insulation airbag is compressed during the switching of the door leaf between the closing state and the opening state.

According to an embodiment of the present application, there is a plurality of the heat-insulation airbags provided at intervals along the thickness direction of the door leaf.

According to an embodiment of the present application, the passage extends along the thickness direction of the door leaf and includes a curved segment, and the passage becomes wider as the second door body moves toward the opening side of the first door body and becomes narrower as the second door body moves toward the hinged side of the first door body.

According to an embodiment of the present application, a groove and a protrusion engaged with each other are disposed between the second door body and the first door body, and the curved segment is disposed between the groove and the protrusion.

According to an embodiment of the present application, heat-insulation foam is provided inside the protrusion.

According to an embodiment of the present application, the passage further includes straight segments located at both ends of the curved segment.

According to an embodiment of the present application, the passage is provided with a heating member.

According to an embodiment of the present application, the heating member is a thin-film heating sheet attached to an inner surface of the passage.

According to an embodiment of the present application, the door assembly is a side-by-side door assembly, and the door leaves include oppositely arranged side-by-side door leaves.

According to an embodiment of the present application, a door seal assembly is provided on an opening side of each of the side-by-side door leaves, the door seal assembly includes an oppositely sucked side door seal extending along a thickness direction of the side-by-side leaf and a main door seal extending along a width direction of the side-by-side leaf, and the oppositely sucked side door seal and the main door seal are connected through an elastic telescopic member.

According to an embodiment of the present application, the door seal assembly is installed at a corner of the side-by-side leaf, and the oppositely sucked side door seal is provided close to an inner surface of the side-by-side leaf.

According to an embodiment of the present application, both the oppositely sucked side door seal and the main door seal are provided with barbs, the barb of the oppositely sucked side door seal is installed on an outer door body, and the barb of the main door seal is installed on an inner door body.

Refrigeration equipment according to an embodiment of the present application includes a box body, and further includes the above-mentioned door assembly, where the door assembly is installed at an opening of the box body.

Since the refrigeration equipment according to embodiments of the present application includes the above-mentioned door assembly, it has all the effects of the above-mentioned door assembly, which will not be repeated here.

According to an embodiment of the present application, the box body includes a refrigerating chamber and a freezing chamber located below the refrigerating chamber; in the case where the door assembly is a side-by-side door assembly, the side-by-side door assembly is provided corresponding to the refrigerating chamber and the freezing chamber; the freezing chamber is provided with a freezing drawer, and a drawer panel of the freezing drawer is sealed with a box tank of the refrigeration equipment in a closed position of the freezing drawer.

Additional aspects and advantages of the present application are set forth, in part, from the following description, and the part will become clear from the following description, or will be learned by practice of the present application.

BRIEF DESCRIPTION OF DRAWINGS

To more clearly illustrate embodiments of the present application or the solutions in the related art, accompanying drawings used in the description of embodiments or the prior art are briefly introduced below. The drawings in the following description only show some embodiments of the present application. For those of ordinary skill in the art, other drawings can also be obtained based on these drawings without creative effort.

REFERENCE NUMBER

Figure 1:
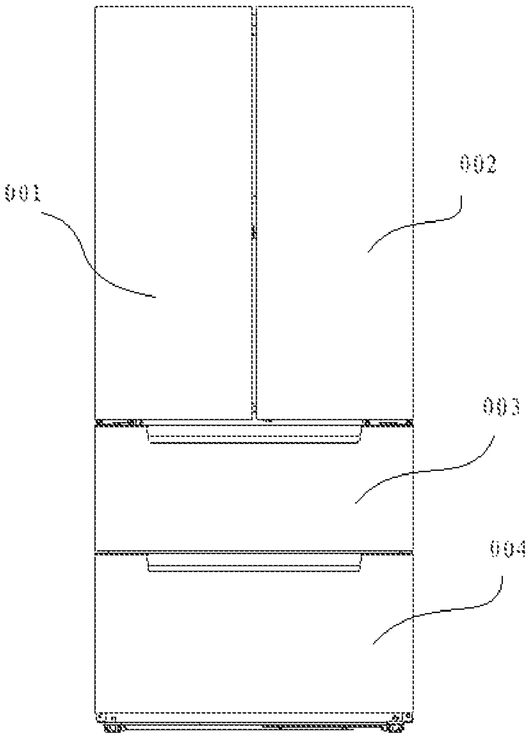
FIG. 1 is a front view of a traditional French-door refrigerator where doors are closed.
Figure 2:
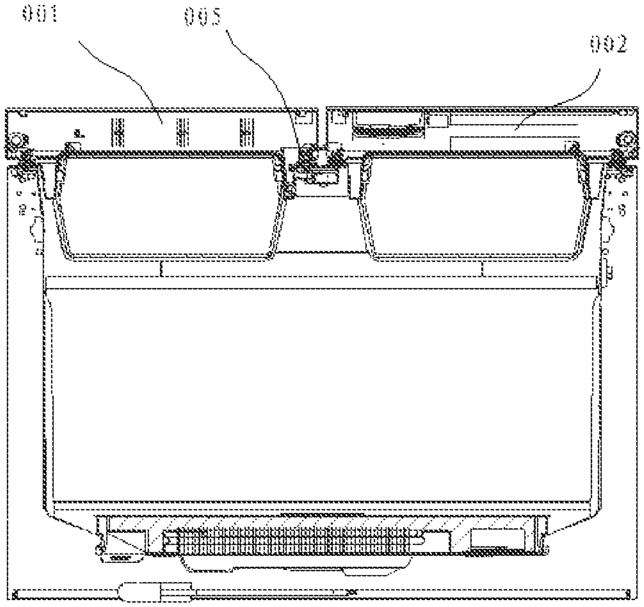
FIG. 2 is a perspective view of a traditional French-door refrigerator where doors are closed.
Figure 3:
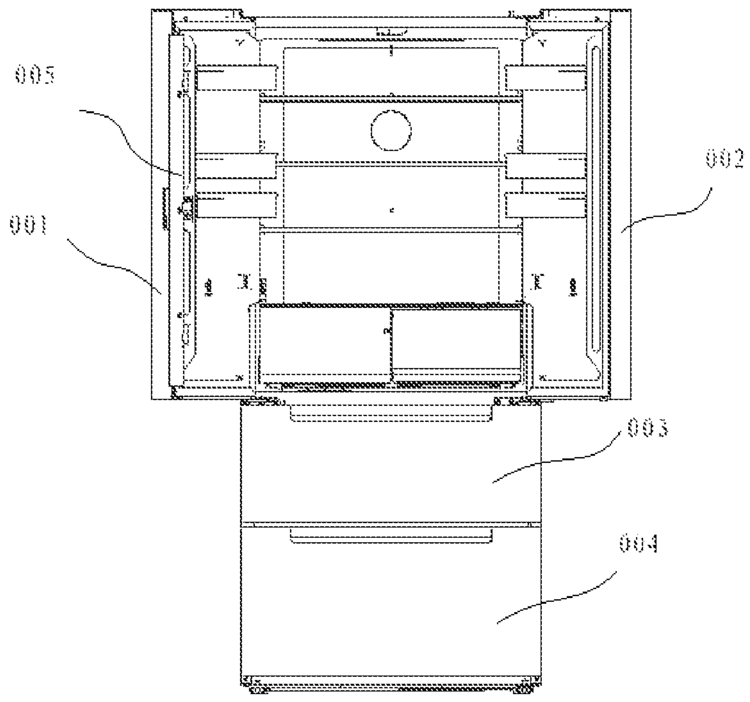
FIG. 3 is a schematic structural diagram of a traditional French-door refrigerator where both left refrigerating door and right refrigerating door are opened.
Figure 4:
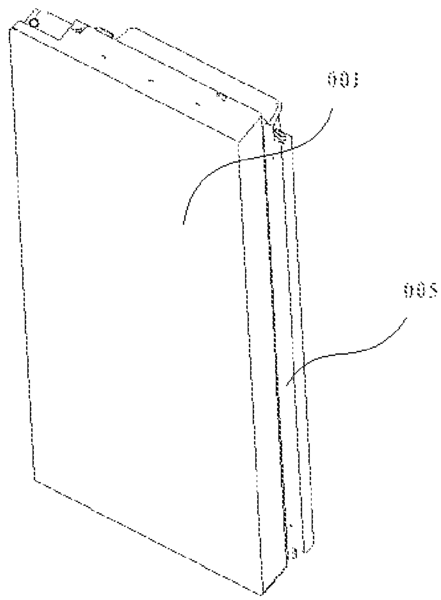
FIG. 4 is a structural view of a left refrigerating door of a traditional French-door refrigerator.

001: left refrigerating door; 002: right refrigerating door; 003: upper freezing door; 004: lower freezing door; 005: flipping beam;

1: first door body; 2: second door body; 201: outer door body door seal; 3: sliding rail;

4: sliding block; 5: first electromagnet; 6: first elastic reset member;

7: door seal assembly; 701: oppositely sucked side door seal; 702: main door seal; 703: elastic telescopic member; 704: barb;

8: passage; 801: curved segment; 802: straight segment;

9: heat-insulation airbag; 10: heating member; 11: protrusion; 12: heat-insulation foam;

13: groove; 14: camera assembly; 15: electrically lifting shelf; 16: fruit and vegetable drawer; 17: lower left drawer; 18: lower right drawer; 19: upper freezing panel; 20: lower freezing panel; 21: middle partition plate; 22: false middle beam; 23: lower beam;

24: seam; 25: drive member; 251: linear motor; 252: rotary motor; 253: screw rod; 254: nut; 26: installation part; 27: movement gap;

28: cam hinge; 281: cam;

29: drive portion; 30: second elastic reset member:

DETAILED DESCRIPTION OF THE EMBODIMENTS

Embodiments of the present application will be described in further detail below with reference to the drawings and embodiments. The following embodiments are intended to illustrate the present application, but not to limit the scope of the present application.

In the description of the present application, it should be noted that, the orientation or positional relations specified by terms such as "central", "longitudinal", "horizontal" "lower", "front", "back", "left", "right", "vertical", "horizontal", "top", "bottom", "inner", "outer" and the like, are based on the orientation or positional relations shown in the drawings, which is merely for convenience of description of the present application and to simplify description, but does not indicate or imply that the stated devices or parts must have a particular orientation and be constructed and operated in a particular orientation, and thus it is not to be construed as limiting the present application. Furthermore, the terms "first", "second", "third" and the like are only used for descriptive purposes and should not be construed as indicating or implying a relative importance.

In the description of the present application, it should be noted that unless explicitly specified and defined otherwise, the terms "connected to" and "connected" shall be understood broadly, for example, it may be either fixedly connected or detachably connected, or can be integrated; it may be either mechanically connected, or electrically connected; it may be either directly connected, or indirectly connected through an intermediate medium. The specific meanings of the terms above in the present application can be understood by a person skilled in the art in accordance with specific conditions.

In embodiments of the present application, unless otherwise expressly specified and defined, a first feature is "on" or "under" a second feature can refer to that the first feature is directly contacted with the second feature, or the first feature is indirectly contacted with the second feature through an intermediate medium. And further, the first feature is "on", "above" and "over" the second feature can refer to that the first feature is directly above or obliquely above the second feature, or simply refer to that the level height of the first feature is higher than that of the second feature. The first feature is "under", "below" and "beneath" the second feature can refer to that the first feature is directly below or obliquely below the second feature, or simply refer to that the level height of the first feature is lower than that of the second feature.

In the description of this specification, description with reference to the terms "one embodiment", "some embodiments", "an example", "specific example", "some examples" and the like, refers to that specific features, structures, materials or characteristics described in combination with an embodiment or an example are included in at least one embodiment or example according to embodiments of the present application. In this specification, schematic representations of the above terms are not necessarily directed to a same embodiment or example. Furthermore, the particular features, structures, materials or characteristics described can be combined in any suitable manner in any one or more embodiments or examples. In addition, those skilled in the art may combine the different embodiments or examples described in this specification, as well as the features of the different embodiments or examples, without conflicting each other.

A French-door refrigerator door body is taken as an example. Referring to FIGS. 1 to FIG. 4, a traditional French-door refrigerator includes a left refrigerating door 001, a right refrigerating door 002, an upper freezing door 003 and a lower freezing door 004. A flipping beam 005 is provided on the left refrigerator door 001. When the French-door refrigerator is closed, viewed from the front, the left refrigerating door 001, the right refrigerating door 002, the upper freezing door 003 and the lower freezing door 004 are combined into a mode of a French-door refrigerator. The flipping beam 005 prevents the space inside the refrigerator and the outside of the refrigerator from exchanging between the left refrigerating door 001 and the right refrigerating door 002. The flipping beam 005 is required that: after the refrigerator door body is closed, the flipping beam and the door body are in a parallel state; and when the refrigerator door body is opened, the flipping beam and the door body are in a vertical state, otherwise the door cannot be closed smoothly when the flipping beam and another door body hit when the door body is closed.

In addition, in other case when a side-by-side door assembly is needed, in order to ensure the sealing effect of the door assembly under the premise of normally opening and closing a door leaf, it is also necessary to dispose a flipping beam 005 or other parts between two oppositely arranged door leaves to eliminate the gap, which results in inconvenient operation of the side-by-side door assembly and the risk of abnormal damage.

Based on the above problems in the related art, an embodiment of the present application provides a door assembly. The door assembly includes several door leaves, and the specific number of the door leaves is not limited. When there is a plurality of door leaves, this kind of door leaves can eliminate the seam between adjacent door leaves in the closing state; when there is one door leaf, this kind of door leaf can eliminate the seam between an opening side of the door leaf and a door frame.

Referring to FIGS. 5 to 25, for the door leaf, it includes two door bodies that can move relatively, that is, a first door body 1 and a second door body 2. The first door body 1 is configured to be rotatably connected to the mounting part 26 (such as a door frame, a box body, etc.), and then the second door body 2 is driven to be rotated to realize the opening and closing of the door leaf as a whole. Taking a refrigerator as an example, the mounting part 26 also refers to the box body of the refrigerator, and the door leaf is installed on the box body. The door leaf can be closed when the first door body 1 drives the second door body 2 to rotate toward the box body of the refrigerator; and the door leaf can be opened when the first door body 1 drives the second door body 2 to rotate away from the box body of the refrigerator. The door assembly in embodiments of the present application can be applied not only to refrigerators, but also to various scenarios such as cabinets, wardrobes, and even living rooms.

On this basis, the second door body 2 is configured to move toward an opening side or a hinged side of the first door body 1 with respect to the first door body 1, and thus the second door body 2 can be switched between a sealing position and an avoidance position. When the second door body 2 moves toward the opening side of the first door body 1, the seam 24 on an opening side of the second door body 2 can be eliminated, and then the second door body 2 moves to the sealing position correspondingly. When the second door body 2 moves toward the hinged side of the first door body 1, a seam 24 can be formed on an opening side of the second door body 2 to ensure that the door leaf can rotate normally, and then the second door body 2 moves to the avoidance position correspondingly.

The door leaf and the first door body 1 and the second door body 2 included therein both have an opening side and a hinged side. Taking a refrigerator as an example, the side on which the door leaf is installed to the box body is the hinged side, and the side opposite to the hinged side is the opening side. In combination with FIGS. 8 and 10, for the door leaf on the left side, the left side of the door leaf is the hinged side, and the right side of the door leaf is the opening side; for the door leaf on the right, the right side of the door leaf is the hinged side, the left side of the door leaf is the opening side. The opening side of the first door body 1 and the opening side of the second door body 2 correspond to the opening side of the door leaf, and the hinged side of the first door body 1 and the hinged side of the second door body 2 correspond to the hinged side of the door leaf. In addition, the seam 24 on the opening side of the second door body 2 is also the seam 24 on the opening side of the door leaf. When the door assembly is a side-by-side door assembly, the seam 24 on the opening side of the door leaf refers to the seam 24 between the side-by-side door leaves; when the door assembly is a single door assembly, the seam 24 on the opening side of the door leaf refers to the seam 24 between the door leaf and the door frame (or other parts to be installed 26 of the door leaf).

The door leaf of embodiments of the present application can be switched between a closing state and an opening state. When the door leaf is in the closing state, the second door body 2 is in the sealing position to eliminate the seam 24 on the opening side of the door leaf. During the door leaf is switched between the closing state and the opening state, the second door body 2 is in the avoidance position to ensure that the door leaf can be opened or closed normally.

According to the door assembly of embodiments of the present application, the door leaf includes the first door body 1 and the second door body 2, and the second door body 2 can move with respect to the first door body 1. When the door leaf is in the closing state, the second door body 2 is moved to the sealing position or remained at the sealing position in order to ensure the sealing effect of the door leaf. When the door leaf needs to be opened and closed, in order to prevent the movement of the door leaf from being interfered, the second door body 2 is moved to the avoidance position or remains at the avoidance position. When this door assembly is applied to a refrigerator, the dependence of the traditional refrigerator on the flipping beam can be changed, and the defect of inflexible division of storage space caused by a partition plate provided in the box body can be avoided.

According to embodiments of the present application, the position of the second door body 2 can be switched automatically. For example, different sensors may be disposed on the door assembly or an object on which the door assembly is installed (such as the box body 7 of the refrigerator) to obtain a door leaf state switching requirement and confirm that the door leaf is in the closing state. For example, the door assembly is provided with a first sensor and a second sensor. The first sensor is used to obtain the door leaf state switching requirement, and the second sensor is used to confirm that the door leaf is in the closing state.

In an embodiment, both the first sensor and the second sensor may be a pressure sensor, an infrared sensor, or a Hall sensor, etc., and the specific form is not limited by the examples herein.

When the first sensor is a pressure sensor, the pressure sensor sends a control signal to a controller (when the side-by-side is installed in the refrigerator, the controller refers to the controller of the refrigerator) based on the obtained external pressure, and the controller controls the second door body 2 to switch positions based on the control signal. For example, when the door leaf is in the closing state, the pressure sensor obtains the external pressure, which means that there is a requirement to open the door, and then the pressure sensor sends a control signal to the controller, and the controller controls the second door body 2 to move to the avoidance position based on the control signal. For another example, when the door leaf is in the opening state, the pressure sensor obtains the external pressure, which means that there is a requirement to close the door at this time, and then the pressure sensor sends a control signal to the controller. If the second door body 2 is in the sealing position, the controller controls the second door body 2 to move to the avoidance position based on the control signal to ensure that the door leaf can be closed; if the second door body 2 is in the avoidance position, the controller does not need to control the second door body 2 to switch positions.

When the first sensor is an infrared sensor, a control signal is sent to the controller when the infrared sensor detects that the user enters the vicinity of the door assembly or the user leaves the vicinity of the door assembly. For example, when the door leaf is in the closing state, the infrared sensor detects that the user moves to the vicinity of the door assembly, which means that there is a requirement to open the door at this time, and then the infrared sensor sends a signal to the controller, and the controller controls the second door body 2 to move to the avoidance position, to ensure that the door leaf can be opened. When the door leaf is switched from the opening state to the closing state, and the infrared sensor detects that the user has left the vicinity of the door assembly for a set duration, it means that the sealing effect of the door leaf needs to be ensured at this time, and then the controller controls the second door body 2 based on the detected signal of the infrared sensor to move to the sealing position.

When the second sensor is a pressure sensor, the second sensor can be installed between the door leaf and the box body of the refrigerator. In an embodiment, when the door leaf is in a closing state, the pressure sensed by the pressure sensor changes from zero to a certain value greater than zero based on the contact between the door leaf of the refrigerator and the box body of the refrigerator. When the pressure value of the pressure sensor is increased from zero to a certain value greater than zero, the pressure sensor sends a control signal to the controller, and the controller controls the second door body 2 to switch to the sealing position based on the control signal.

When the second sensor is an infrared sensor, the infrared transmitter and the infrared receiver of the infrared sensor can be respectively installed on the door leaf and the box body. Therefore, when the door leaf is in the opening state, the infrared transmitter and the infrared receiver have no corresponding relationship. When the door leaf is in the closing state, the infrared transmitter corresponds to the infrared receiver. The infrared transmitter transmits an infrared signal to the infrared receiver, and the infrared receiver sends a control signal to the controller based on the received infrared signal. The controller controls the second door body 2 to switch to the sealing position based on the control signal.

When the second sensor is a Hall sensor, the Hall sensor is installed on one of the door leaf and the box body, and a magnetic member corresponding to the Hall sensor is installed on the other of the door leaf and the box body. When the relative positional relationship between the door leaf and the box body changes until the door leaf is in the closing state, the distance between the magnetic member and the Hall sensor changes, and then the Hall sensor can sense the change in the surrounding magnetic field in time and send it to the controller. The controller can control the second door body 2 to switch to the sealing position based on the signal sent by the Hall sensor. The magnetic member may, but not necessarily, be in the form of a magnet. The magnetic member refers to objects that can respond to a magnetic field in a certain way, but is not required to generate a magnetic field itself. The magnetic member can be made of any magnetic material, such as magnets, low carbon steel, etc.; and the magnetic member can also be an energized coil. The Hall sensor may include an elastic sheet matched with the magnet and a circuit. When the magnet is away from or close to the elastic sheet, the elastic sheet is bounced, and the current of the circuit changes. In this case, the controller controls the state switching of the second door body 2 based on the change of the current. The specific type of the Hall sensor is not limited by the examples here.

The type and working principle of the first sensor above are not limited by the above examples, as long as it can be used to determine the requirement of the user about opening or closing the door. Similarly, the type and working principle of the second sensor are not limited, as long as it can be used to detect whether the door leaf is in a closing state.

Figure 12:
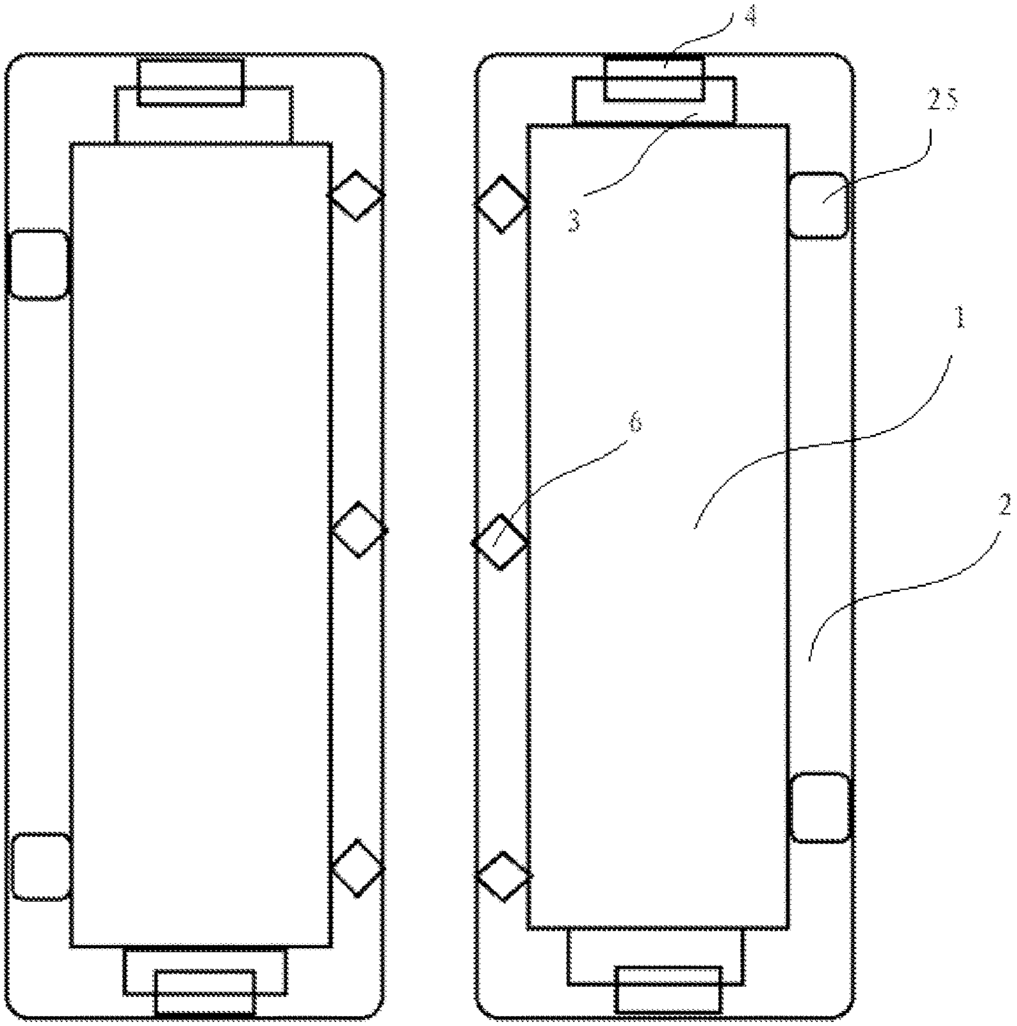
FIG. 12 is a view of an assembly relationship between a first door body and a second door body according to an embodiment of the present application.
Figure 13:
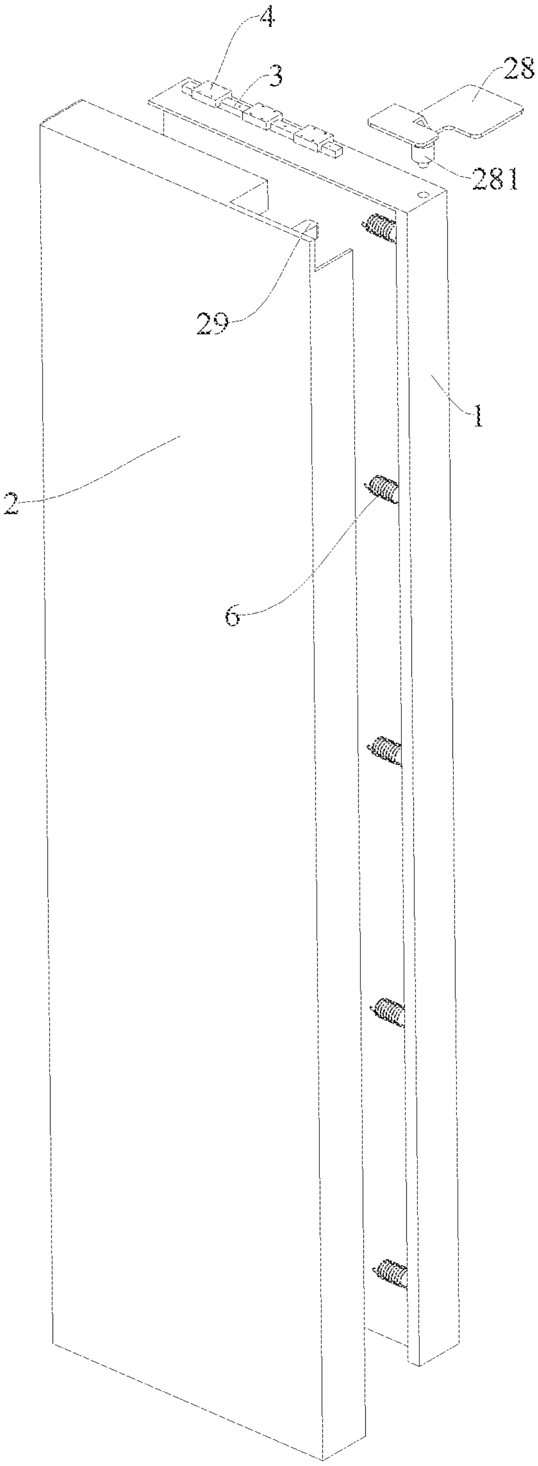
FIG. 13 is an exploded structural view of a door leaf according to an embodiment of the present application in a perspective, where the door leaf includes a cam hinge and a drive portion.
Figure 14:
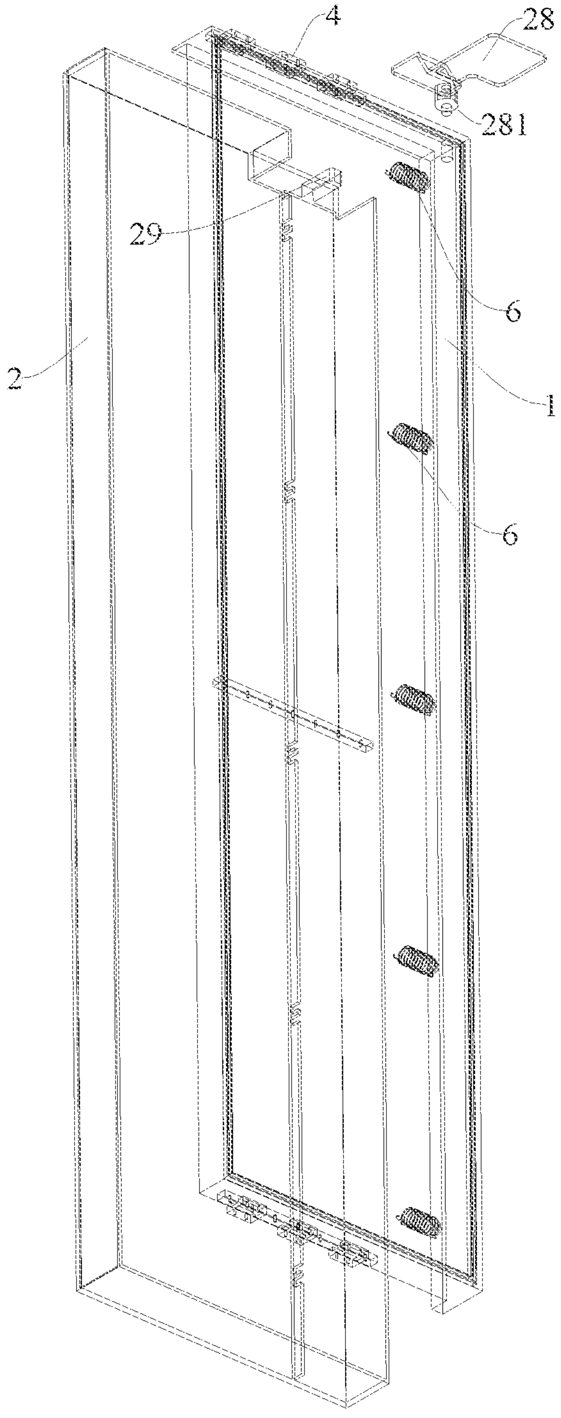
FIG. 14 is an exploded structural view of a door leaf according to an embodiment of the present application in another perspective, where the door leaf includes a cam hinge and a drive portion.
Figure 15:
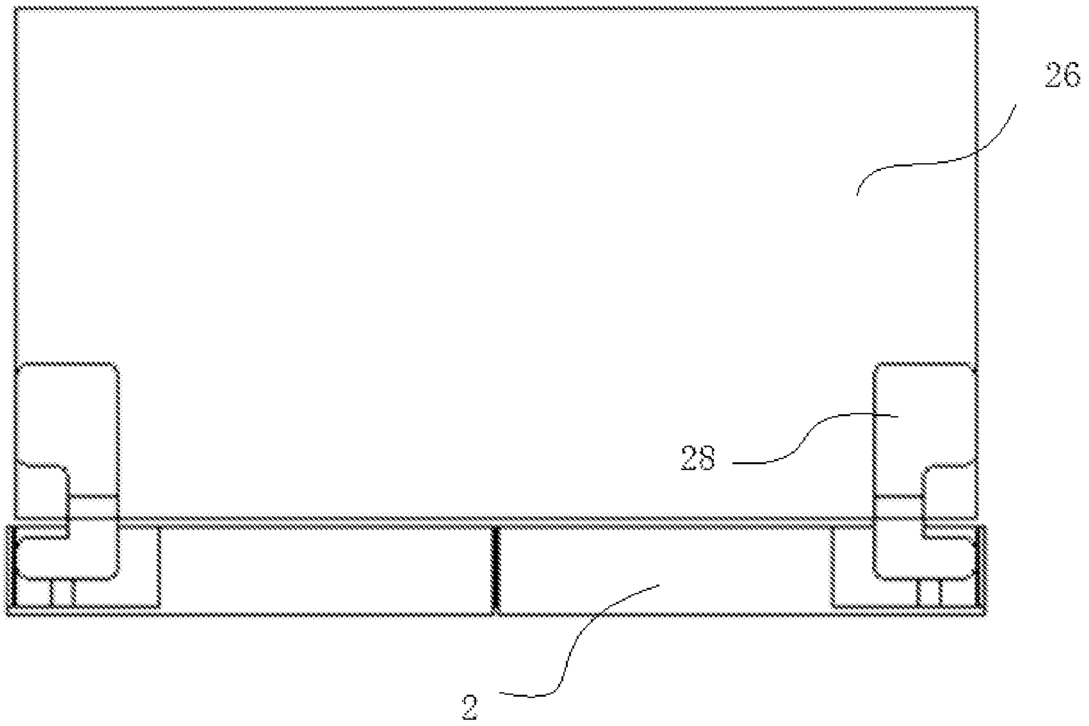
FIG. 15 is an assembly view of a door assembly according to an embodiment of the present application, where the door assembly includes a cam hinge and a drive portion.
Figure 16:
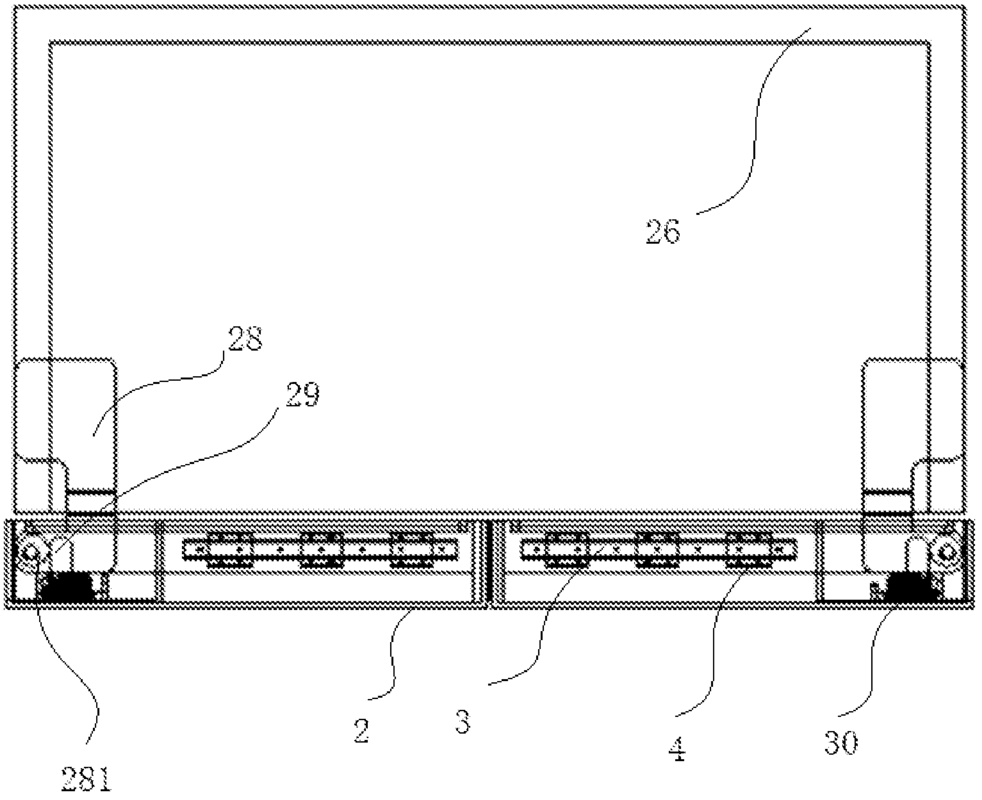
FIG. 16 is a perspective view of a door assembly provided by embodiments of the present application in an assembled state, where the door assembly includes a cam hinge and a drive portion.

According to embodiments of the present application, referring to FIG. 12, the first door body 1 is located inside the second door body 2. In this case, the second door body 2 wraps completely or partially the first door body 1. The structures of the first door body 1 and the second door body 2 are not limited by the examples here. For example, the first door body 1 and the second door body 2 may also be arranged side by side along a front-rear direction. The front-rear direction refers to a thickness direction of the door leaf.

According to embodiments of the present application, when the second door body 2 wraps completely or partially the first door body 1, the first door body 1 is the inner door body, and the second door body 2 is the outer door body. According to embodiments of the present application, referring to FIG. 18, since the outer door body can move with respect to the inner door body, that is, a movement gap 27 must be reserved between the outer door body and the inner door. The presence of this movement gap 27 can affect the performance of the door assembly. For example, when this door assembly is applied to a refrigerator, the inside of the refrigerator will exchange heat with the outside through the movement gap 27, thereby affecting energy consumption and causing condensation on the door body near the movement gap 27. In order to ensure the performance of this door assembly, embodiments of the present application provide the following ways illustrated in FIG. 19 to FIG. 23, which can be combined with each other.

In a first way: the heat-insulation airbag 9 is provided on the opening side of the door leaf along a moving direction of the outer door body with respect to the inner door body. A first end of the heat-insulation airbag 9 is connected to the inner door body, and a second end of the heat-insulation airbag 9 is connected to the outer door body. When the door leaf is in the closing state, the outer door body is in the sealing position and the heat-insulation airbag 9 is stretched. When the door leaf needs to switch between the closing state and the opening state, the outer door body is in the avoidance position and the heat-insulation airbag 9 is compressed.

The heat-insulation airbag 9 can be filled in the movement gap 27 between the outer door body and the inner door body, thereby ensuring the performance of the door assembly. When the door assembly is applied to a refrigerator, the heat-insulation airbag 9 can form a protective device to prevent leakage of cold air, thereby reducing or even avoiding heat exchange between the inside of the refrigerator and the outside to prevent the generation of condensed dewdrop on the surface of the outer door body of the door leaf. Moreover, the arrangement of the heat-insulation airbag 9 will not affect the movement of the outer door body with respect to the inner door body.

According to embodiments of the present application, the number of the heat-insulation airbags 9 is not limited, and may be one or more. When there is a plurality of the heat-insulation airbags 9, the plurality of heat-insulation airbags 9 are provided at intervals along the thickness direction of the door leaf, and thus the plurality of heat-insulation airbags 9 have multi-layer heat insulated protective effect in the direction from the inner side to the outer side of the door leaf, which can further improve the performance of the door leaf. In addition, the size of the heat-insulation airbag 9 along a height direction of the door leaf generally corresponds to the height of the door leaf. It is not excluded that a plurality of heat-insulation airbags 9 are provided along the height direction of the door leaf to provide the heat-insulation effect.

In a second way: a passage 8 extending along a thickness direction of the door leaf is formed between the opening side of the first door body 1 and the opening side of the second door body 2, and the passage 8 includes a curved segment 801. The width of the passage 8 is reduced when the outer door body moves to the sealing position with respect to the inner door body toward the opening side of the inner door body. The width of the passage 8 is increased when the outer door body is configured to move to the avoidance position with respect to the inner door body towards the hinged side of the inner door body.

Through the arrangement of the curved segment 801, the performance of the door assembly can be improved. For example, when the door assembly is applied to a refrigerator, the path for cold air leakage can be prolonged and the resistance to cold air leakage can be increased through the arrangement of the curved segment 801, thereby reducing or even avoiding heat exchange between the inside of the refrigerator and the outside, so as to prevent condensation on the surface of the outer door body of the door leaf.

According to an embodiment of the present application, the "curved segment 801" is a concept corresponding to the "straight segment 802". That is, as long as it is not in the form of the straight segment 802, it can be understood as the "curved segment 801" here. For example, the "curved segment 801" includes the structural form of an arc-shaped segment, and further includes the structural form of a bent segment formed by connecting a plurality of straight segments 802. Furthermore, if the passage 8 in embodiments of the present application has various structural forms, it can even be designed in the form of a maze.

According to an embodiment of the present application, when the curved segment 801 is provided, the passage 8 may further include a straight segment 802 located at least one end of the curved segment 801.

Figure 20:
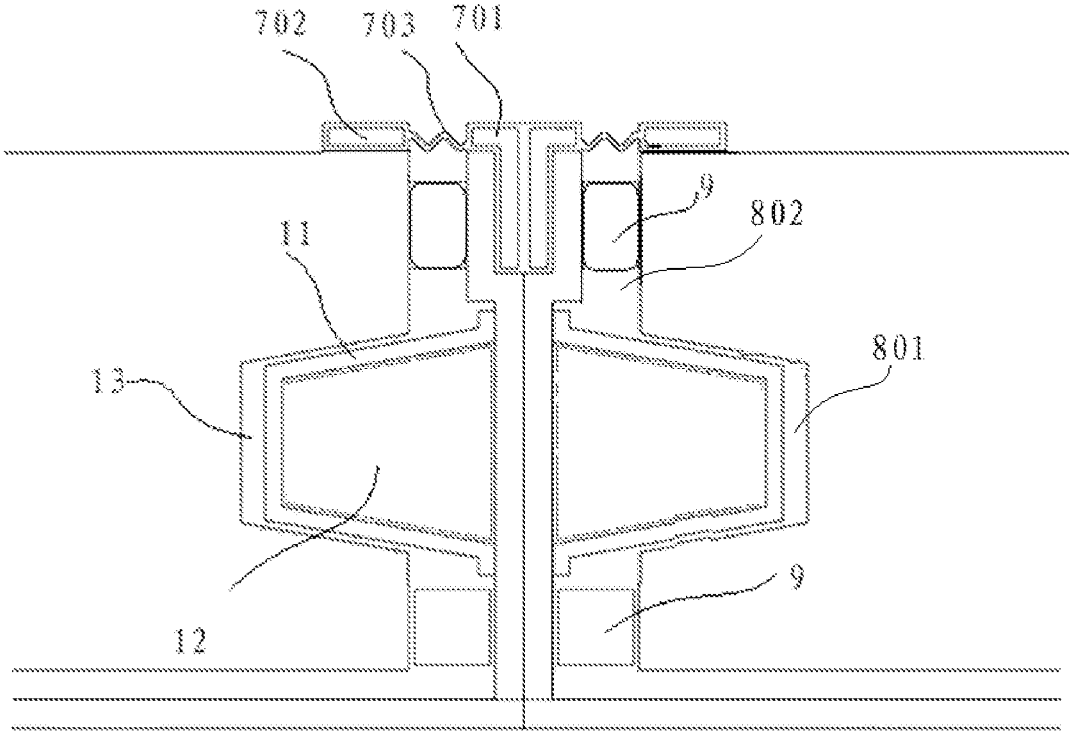
FIG. 20 is a partial enlarged view of an opening side of a door leaf in FIG. 19.
Figure 21:
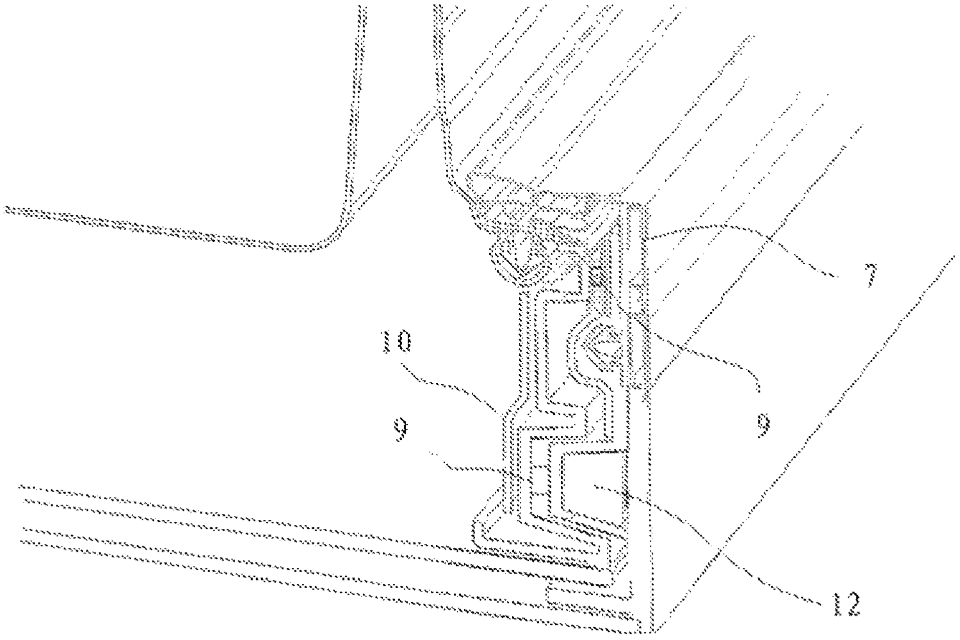
FIG. 21 is a structural view of an opening side of a door leaf according to an embodiment of the present application.
Figure 22:
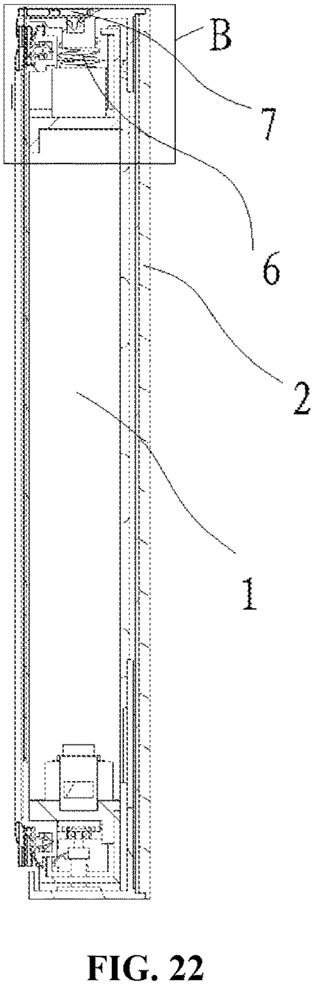
FIG. 22 is a view of the installation of a door seal assembly according to an embodiment of the present application.

In an embodiment, referring to FIG. 20, one of the outer door body and the inner door body is formed with a groove 13, and the other of the outer door body and the inner door body is formed with a protrusion 11. Furthermore, an above-mentioned curved segment 801 is formed between the protrusion 11 and the groove 13. The formation of the curved segment 801 is not necessarily in this way. For example, both the outer door body and the inner door body may be formed with protrusions 11, and the two parts of the protrusions 11 are matched with each other to form the curved segment 801. When the outer door body or the inner door body is provided with the protrusions 11, the protrusions 11 may be provided in a hollow structural form, and the insulating foam 12 is provided inside the hollow protrusions 11. For example, the heat-insulation foam 12 can be made of expanded polystyrene (EPS), heat-insulation polyurethane or other materials with heat-insulation effect. Other forms of heat-insulation members can also be used in the protrusion 11 to ensure the heat-insulation effect of the position of the passage 8.

In a third way: a passage 8 extending along a thickness direction of the door leaf is disposed between the opening side of the first door body 1 and the opening side of the second door body 2, and a heating member 10 is provided corresponding to the position of the passage 8. Similarly, the width of the passage 8 is reduced when the outer door body moves to the sealing position with respect to the inner door body toward the opening side of the inner door body. The width of the passage 8 is increased when the outer door body is configured to moving to the avoidance position with respect to the inner door body towards the hinged side of the inner door body.

By setting the heating member 10, the local temperature of the door leaf can be compensated to prevent the generation of condensed dewdrop. For example, when the door assembly is applied to a refrigerator, a heating member 10 is provided in the passage 8, and when the temperature of the outer door body corresponding to the passage 8 is low due to the cold air leakage, the heating member 10 operates to locally heat the outer door body, thereby preventing the generation of condensed dewdrop on the outer door body.

According to embodiments of the present application, the specific form of the heating member 10 is not limited, for example, the heating member 10 may be in various forms such as a thin-film heating sheet, a heating wire, and a heating tube. When the heating member 10 is a thin film heating sheet, it can not only save space, but also ensure heating efficiency.

The heating member 10 can be attached to the inner surface of the passage 8, can be provided in the passage 8, and can also be fixed to a side wall or outer surface of the passage 8, as long as the corresponding position of the passage 8 can be locally heated.

In a fourth way: the door assembly is a side-by-side door assembly, and a door seal assembly 7 is provided on the opening side of the door leaf.

By arranging the door seal assembly 7 on the opening side of the side-by-side leaf, the performance of the door assembly can be further improved.

According to embodiments of the present application, the door seal assembly 7 can adopt an oppositely sucked door seal. After the door leaf is closed, the opposite-suction door seal can be attached together to prevent cold leakage at the seam 24 of the door assembly.

Figure 23:
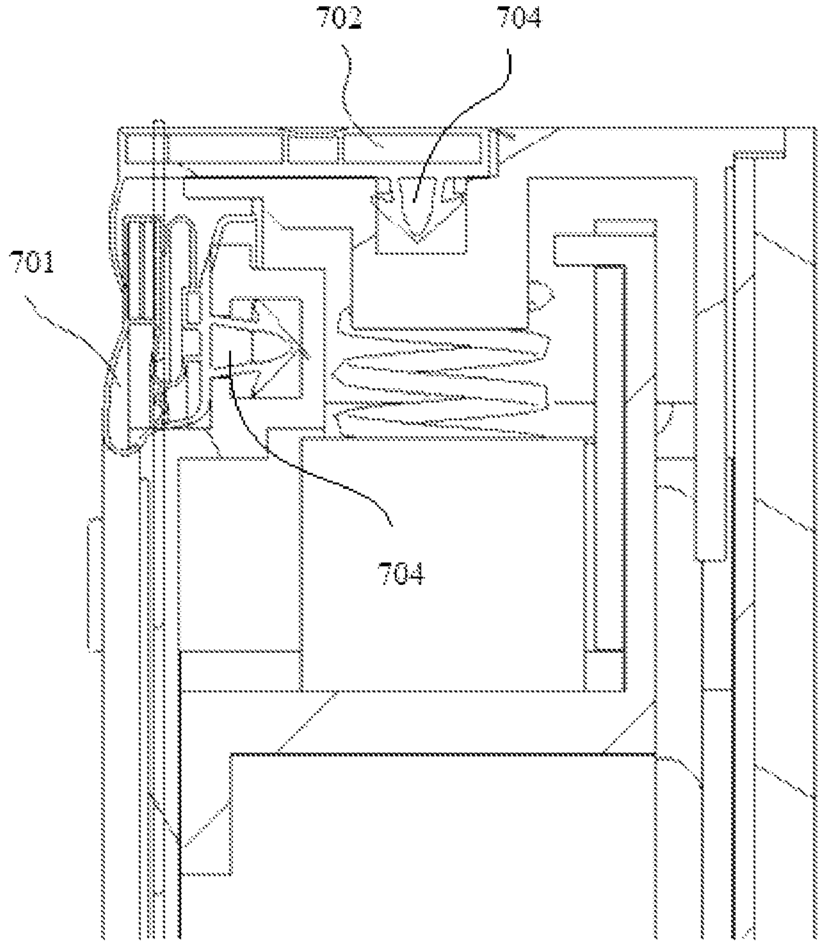
FIG. 23 is a partial enlarged view of FIG. 12 at B.

In an embodiment, referring to FIG. 20 and FIG. 23, the door seal assembly 7 includes an oppositely sucked side door seal 701 extending along a thickness direction of the side-by-side leaf, and a main door seal 702 extending along a width direction of the door leaf, please. In an embodiment, the oppositely sucked side door seal 701 and the main door seal 702 are connected by an elastic telescopic member 703, that is, the situation in FIG. 20. By arranging the elastic telescopic member 703 between the oppositely sucked side door seal 701 and the main door seal 702, the door seal assembly 7 can have extensibility, without affecting the normal movement of the outer door body. The specific structural form of the elastic telescopic member 703 is not limited, for example, the elastic telescopic member 703 may adopt a wave-shaped structure, a semicircular structure, a curvilinear structure, and the like. In an embodiment, the elastic telescopic member 703 adopts a spring, which is cheap and readily available.

According to embodiments of the present application, the door seal assembly 7 is installed at a corner of the side-by-side leaf, and the oppositely sucked side door seal 701 is provided close to an inner surface of the side-by-side leaf.

According to embodiments of the present application, both the oppositely sucked side door seal 701 and the main door seal 702 are provided with barbs 704. The barb 704 of the oppositely sucked side door seal 701 is installed on an outer door body, and the barbs 704 of the main door seal 702 are installed on an inner door body. Through the arrangement of the barbs 704, the door seal assembly 7 can be quickly disassembled and assembled. The installation method of the door seal assembly 7 is not limited by the examples here.

Two different structural forms of the oppositely sucked side door seal 701 and the main door seal 702 are shown in FIG. 20 and FIG. 23 respectively. The structural forms of the oppositely sucked side door seal 701 and the main door seal 702 are not limited by the figures, as long as the sealing effect can be achieved.

According to embodiments of the present application, the above four ways of improving the performance of the door assembly can be combined arbitrarily. When the above four ways are combined on the same door assembly, and the obtained door assembly is applied to a refrigerator, condensed dewdrop on the outer door body can be completely prevented. When the first way is combined with the second way, the heat-insulation airbag 9 can be provided in the curved segment 801 or the straight segment 802 of the passage 8. When the passage 8 includes the curved segment 801 and the straight segments 802 located at both ends of the curved segment 801, the heat-insulation airbag 9 can be provided in the straight segments 802 located at both ends of the curved segment 801, which can maximize the performance of heat-insulation function of the air bag 9 and the curved segment 801, and can be convenient for the installation of the heat-insulation airbag 9.

According to an embodiment of the present application, a drive member 25 is provided between the first door body 1 and the second door body 2, and the drive member 25 is configured to drive the second door body 2 to move toward the opening side and/or the hinged side of the first door body 1 corresponding to the second door body 2. The position of the second door body 2 can be automatically switched by the arrangement of the drive member 25, which is convenient to operate the door body. The drive member 25 can also be provided at any other achievable position in addition to a position between the first door body 1 and the second door body 2, as long as the drive member 25 can drive the second door body 2 for position switching. Moreover, the form of the drive member 25 is not limited, as long as it can provide the power required for the movement of the second door body 2.

Figure 5:
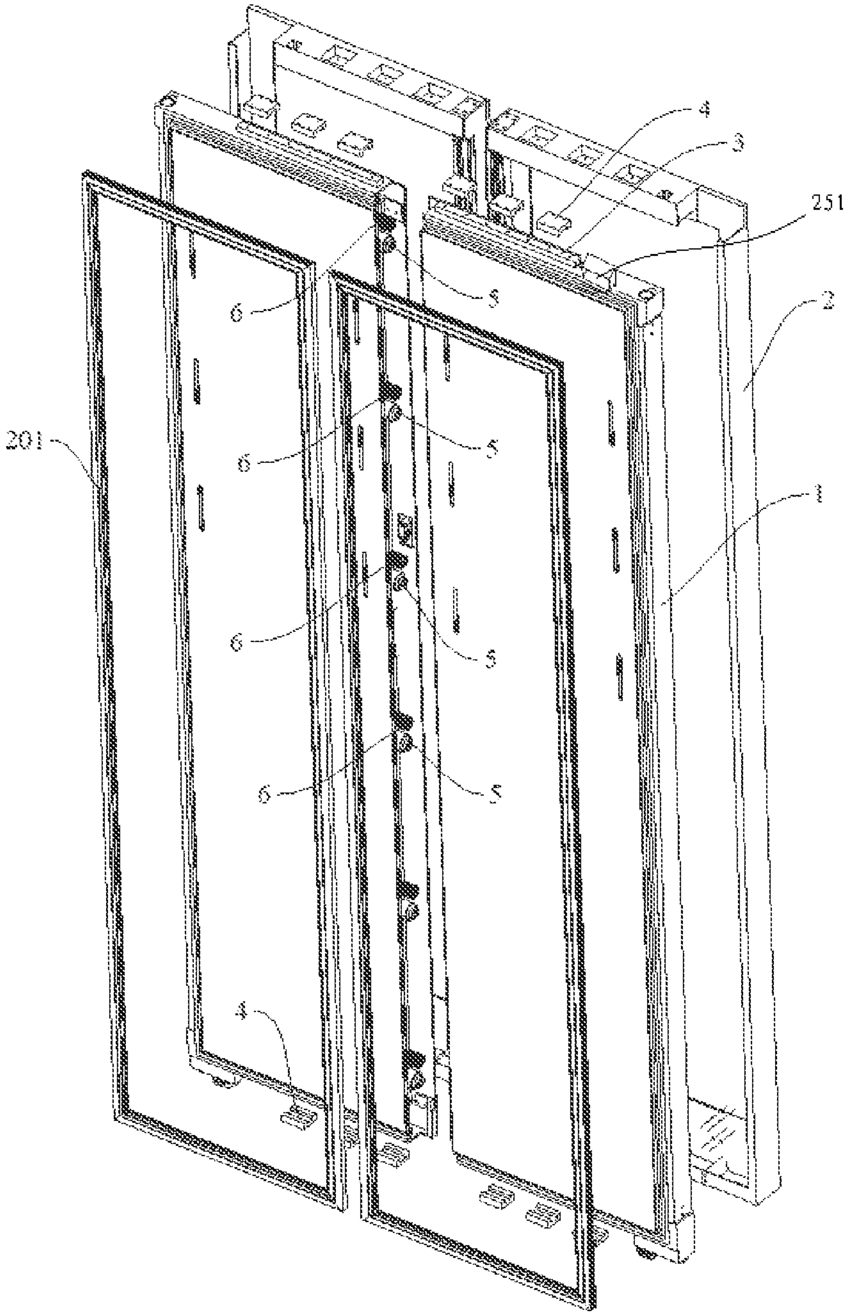
FIG. 5 is a first exploded schematic structural diagram of a door assembly according to an embodiment of the present application.
Figure 26:
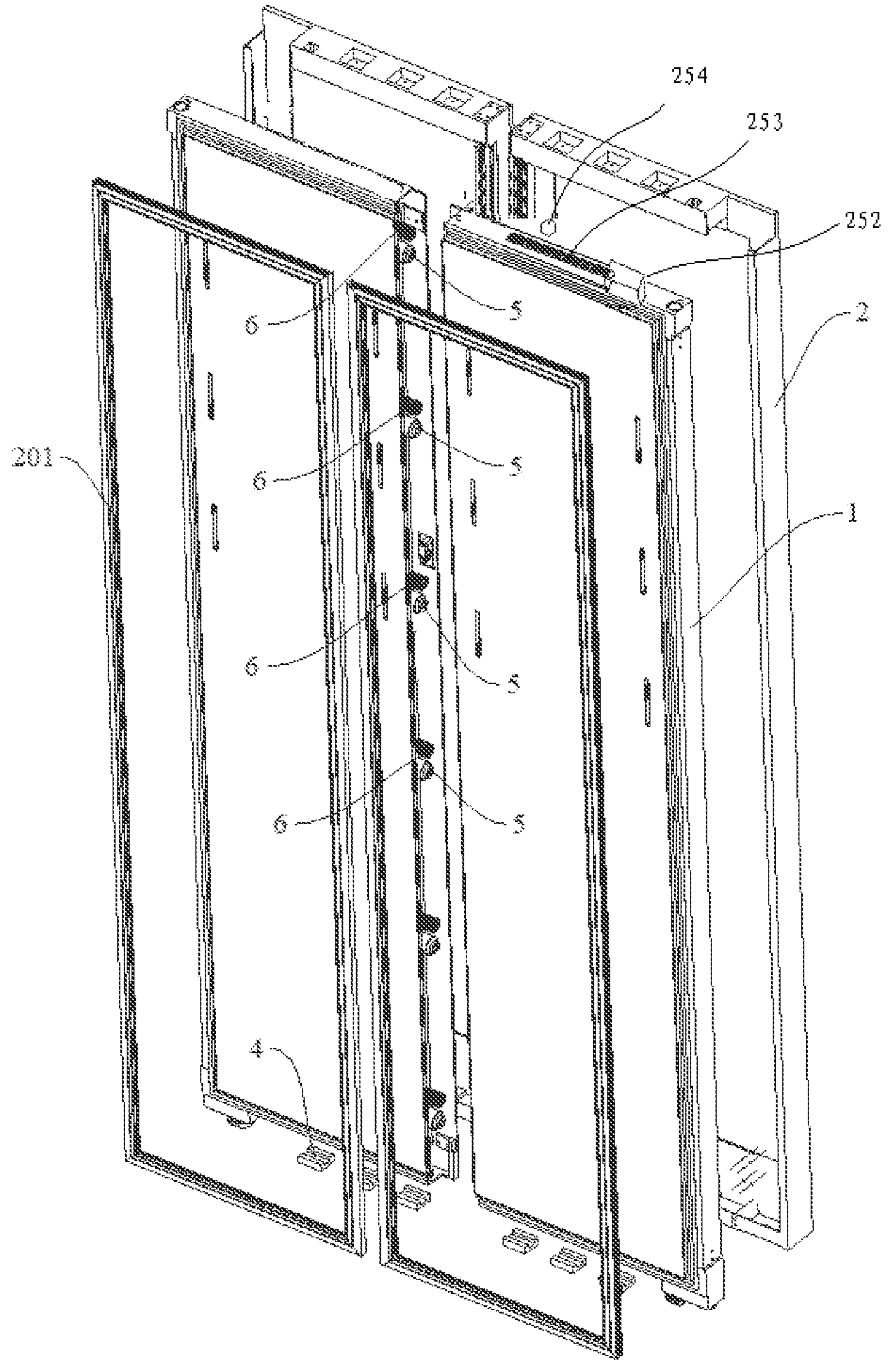
FIG. 26 is a second exploded structural view of a door assembly according to an embodiment of the present application.

According to an embodiment of the present application, referring to FIG. 12, the drive member 25 may include a motor, and then the second door body 2 moves with respect to the first door body 1 under the driving of the motor. FIG. 12 mainly shows a connection relationship between the first door body 1, the second door body 2 and the drive member 25, and does not constitute a limitation on the specific structural form and arrangement position of the drive member 25. Although the motor is provided on the hinged sides of the first door body 1 and the second door body 2 in FIG. 12, the motor can also be provided at other positions of the door leaf. In an embodiment, referring to FIG. 5 and FIG. 6, the drive member 25 includes a linear motor 251. The linear motor 251 is installed on the first door body 1, the first door body 1 is provided with a sliding rail 3, and the second door body 2 is provided with a sliding block 4, and an output shaft of the linear motor 251 is connected to the sliding block 4 to drive the sliding block 4 to make linear motion along the sliding rail 3. Only the linear motor 251 of one door leaf is shown in FIG. 5, and it can be understood that another door leaf may also be provided with a linear motor 251 correspondingly to drive the sliding block 4 to make linear motion. In another embodiment, referring to FIG. 26, the drive member 25 includes a rotary motor 252, the rotary motor 252 is installed on the first door body 1, the first door body 1 is provided with a screw rod 253, and the second door body 2 is provided with a nut 254, an output shaft of the rotary motor 252 is connected to the screw rod 253 to drive the nut 254 to make linear motion along the screw rod 253. Therefore, when the output shaft of the rotary motor 252 rotates, the screw rod 253 can be driven to rotate, so as to drive the nut 254 to make linear motion along the screw rod 253. Similarly, only the rotary motor 252, the screw rod 253 and the nut 254 of one door leaf are shown in FIG. 26, it is understood that another door leaf can also be provided with a rotary motor 252, a screw rod 253 and a nut 254 correspondingly. The installation positions of the rotary motor 252, the screw rod 253 and the nut 254, as well as the installation positions of the linear motor 251, the sliding rail 3 and the sliding block 4 can also be exchanged correspondingly if conditions permit.

According to an embodiment of the present application, the drive member 25 may include a magnetic member, and the magnetic member may generate a magnetic field to change the acting force exerted on the second door body 2. The position of the second door body 2 is switched based on the change of the acting force. For example, at least one of the first door body 1 and the second door body 2 is provided with a first electromagnet 5, and the first electromagnet 5 includes a power-on state and a power-off state. When the state of the first electromagnet 5 is switched, the acting force exerted on the second door body 2 changes.

In an embodiment, one of the first door body 1 and the second door body is provided with a first electromagnet 5, and the other of the first door body 1 and the second door body is provided with a magnetic part (such as an iron block) that can interact with the first electromagnet 5. Furthermore, when the first electromagnet 5 is powered on or powered off, the acting force exerted on the magnetic part changes, so that the second door body moves to the sealing position or the avoidance position. In another embodiment, both the first door body 1 and the second door body 2 are provided with a first electromagnet 5. When the first electromagnet 5 is powered on, a mutual exclusive acting force is generated between the first door body 1 and the second door body 2, so that the second door body 2 moves to the avoidance position. In a further embodiment, both the first door body 1 and the second door body 2 are provided with a first electromagnet 5, and when the first electromagnet 5 is powered on, a mutual attractive acting force is generated between the first door body 1 and the second door body 2, so that the second door body 2 moves to the sealing position.

According to an embodiment of the present application, when the door assembly is a side-by-side door assembly, there is a plurality of door leaves, which includes oppositely arranged side-by-side door leaves. In this case, the drive member 25 can not only be provided between the first door body 1 and the second door body 2 of the same door leaf, but also can be provided between different door leaves. For example, the drive member 25 includes a second electromagnet, the second electromagnet includes a power-on state and a power-off state, and the second electromagnet is provided on an opening side of the second door body 2 of the side-by-side leaf. When the state of the second electromagnet is switched, the second door body 2 of the side-by-side leaf exerts the acting force to each other or cancel it, so that the second door body 2 of the side-by-side leaf move with respect to or opposite to each other. In an embodiment, the two second door bodies 2 are provided with second electromagnets, and when the second electromagnets are powered on, a mutually exclusive acting force is generated between the two second door bodies 2, so that the second door bodies 2 move to the avoidance position. In another embodiment, the two second door bodies 2 are both provided with second electromagnets, and when the second electromagnets are powered on, a mutually attractive acting force is generated between the two second door bodies 2, so that the second door bodies 2 move to the sealing position. The structure and arrangement position of the second electromagnet may also refer to the first electromagnet 5 in FIG. 5 to FIG. 7.

According to embodiments of the present application, a first elastic reset member 6 is connected between the second door body 2 and the first door body 1, and the drive member 25 and the first elastic reset member 6 respectively drive and reset the second door body 2. In an embodiment, when the door leaf needs to switch between the closing state and the opening state, the drive member 25 drives the second door body 2 to move to the avoidance position. The acting force exerted on the second door body 2 by the drive member 25 is cancelled, and the first elastic reset member 6 drives the second door body 2 to move to the sealing position. In another embodiment, in the closing state, the drive member 25 drives the second door body 2 to move to the sealing position; when the door leaf needs to switch between the closing state and the opening state, the first elastic reset member 6 drives the second door body 2 to move to the avoidance position. When the first elastic reset member 6 is provided, the first elastic reset member 6 can be fixed to the first door body 1 or the first elastic reset member 6 can also be fixed to the second door body 2.

Even if no first elastic reset member 6 is provided, the second door body 2 can be simultaneously driven and reset by the drive member 25, so that the second door body can be in the sealing position or the avoidance position. For example, when the drive member 25 includes a motor, the second door body 2 can be driven by the motor to switch between the sealing position and the avoiding position. That is, when the motor moves forward, it drives the second door body 2 to move to the sealing position; when the motor moves backward, it drives the second door body 2 to move to the avoidance position. For another example, when the drive member 25 includes the first electromagnet 5, the second door body 2 can be driven to switch between the sealing position and the avoidance position by switching the state of the first electromagnet 5. For example, when the first electromagnet 5 is powered on in the forward direction, the second door body 2 moves to the sealing position under the action of the magnetic field; when the first electromagnet 5 is powered on in the reverse direction, the second door body 2 moves to the avoidance position under the action of the magnetic field.

Figure 6:
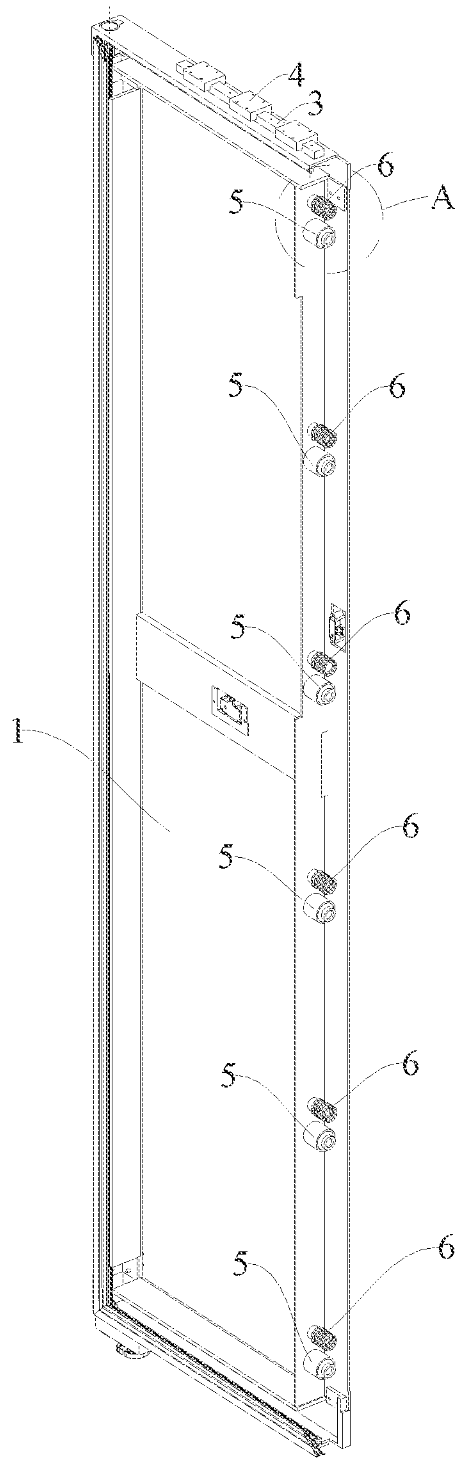
FIG. 6 is a partial exploded schematic structural diagram of a door leaf according to an embodiment of the present application.
Figure 7:
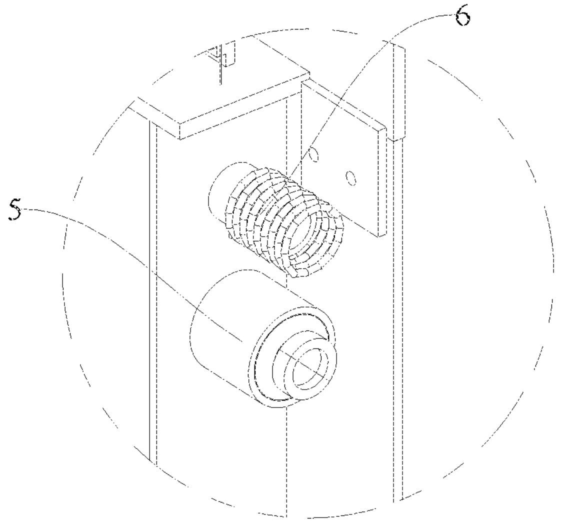
FIG. 7 is a partial enlarged view of FIG. 6 at A.

According to an embodiment of the present application, referring to FIG. 5 and FIG. 6, when the first elastic reset member 6 is provided between the first door body 1 and the second door body 2, there may be a plurality of the first elastic reset members 6 distributed along a height direction of the door leaf to ensure that the first door body 1 and the second door body 2 are evenly stressed. The number and specific distribution form of the first elastic reset members 6 are not limited by the examples here, as long as an acting force can be applied to the second door body 2 to realize the reset of the second door body 2.

According to an embodiment of the present application, in addition to providing the drive member 25 as a power unit to drive the second door body 2 to move with respect to the first door body 1, it is also possible to reasonably provide the accessories of the door leaf, so that the second door body 2 can move with respect to the first door body 1 during the opening and closing of the door leaf.

According to an embodiment of the present application, referring to FIG. 13 to FIG. 17, the first door body 1 of the door leaf is configured to be connected to the mounting part 26 through a cam hinge 28, and the second door body 2 is provided with a drive portion 29 being in contact engagement with the cam hinge 28. The drive portion 29 rotates with respect to the cam hinge 28 during the switching of the door leaf from the closing state to the opening state and a distance between the drive portion 29 and an axis of the cam hinge 28 becomes smaller, so that the second door body 2 moves toward the hinged side of the first door body 1 with respect to the first door body 1. The door assembly can make the second door body 2 move with respect to the first door body 1 without additionally providing a power unit (such as the aforementioned motor or a magnetic member).

Taking the application of the door assembly on the refrigerator as an example, the above mentioned mounting part is the box body of the refrigerator. Since the application scenario of the door assembly of embodiments of the present application is not limited to the refrigerator, the mounting part may also refer to other objects.

Figure 17:
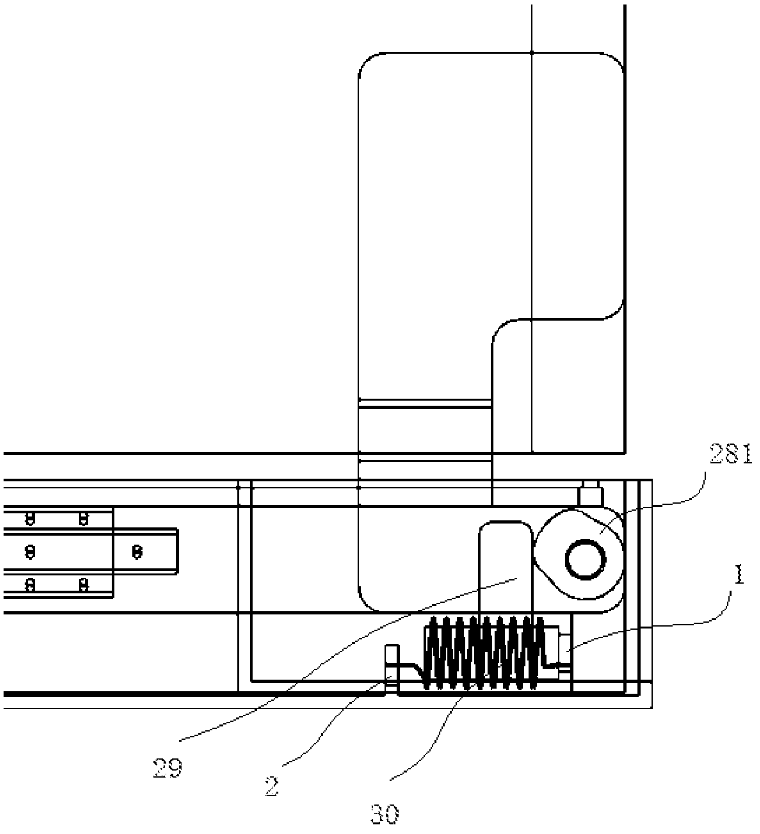
FIG. 17 is a partial enlarged view corresponding to the structure of a hinged side in FIG. 16.
Figure 18:
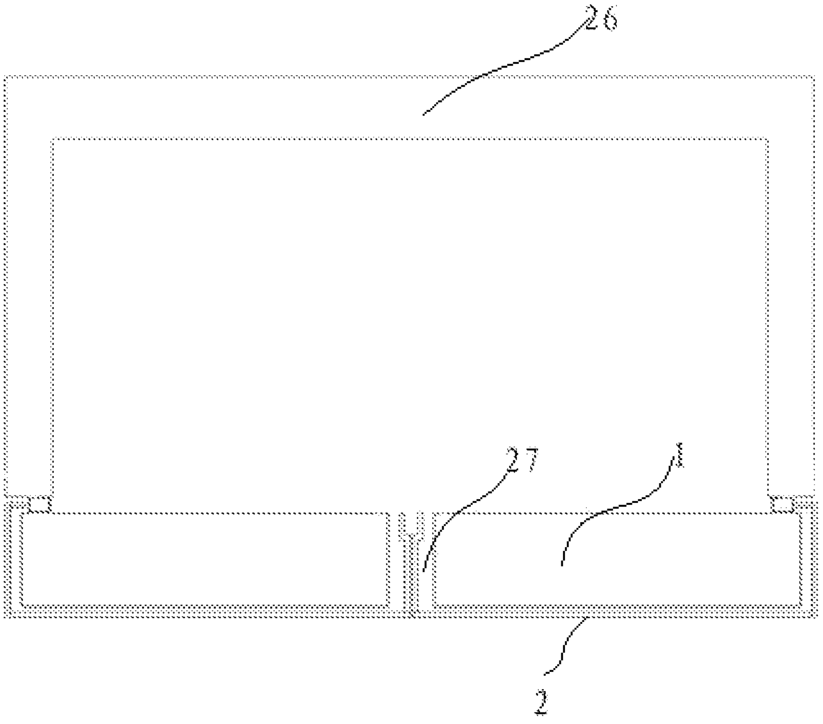
FIG. 18 is an assembly view of a door assembly when a movement gap is reserved between a first door body and a second door body according to an embodiment of the present application.
Figure 19:
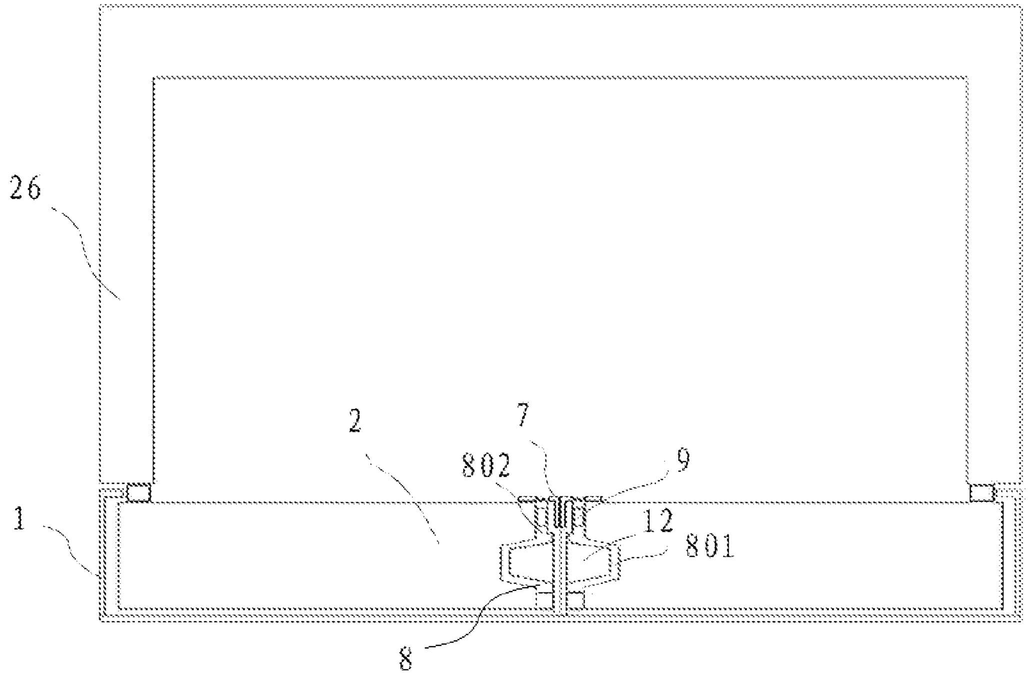
FIG. 19 is an assembly structural view of a door assembly with improved performance according to an embodiment of the present application.

In conjunction with FIG. 17, the drive portion 29 on the door leaf is disposed closer to the opening side than the cam hinge 28, and then during the door leaf is switched from the closing state to the opening state, since the distance between the drive portion 29 and the axis of the cam hinge 28 becomes smaller, a seam 24 is gradually formed on the opening side of the door leaf, and the seam 24 can ensure the normal rotation of the door leaf and prevent the movement of the door leaf from being interfered.

According to an embodiment of the present application, the cam hinge 28 refers to a hinge that can change the distance between the axis of the cam hinge 28 and the drive portion 29 as the door leaf rotates. The axis of the cam hinge 28 refers to the central axis of rotation of the cam hinge 28 (hereinafter may also be referred to as the axis for short). In FIG. 17, the cam hinge 28 includes a cam 281 engaged with the drive portion 29. As the door is opened and closed, the drive portion 29 rotates with respect to the cam 281 and abuts against different positions of the cam 281, thereby changing the distance between the drive portion 29 and the axis of the cam hinge 28. The structure of the cam 281 and the drive portion 29 is not limited, as long as the distance between the axis of the cam hinge 28 and the drive portion 29 can be changed as the door leaf rotates. For example, the cam 281 may be formed with an involute surface engaged with the drive portion 29. For another example, the drive portion 29 engaged with the cam 281 may be a stopper fixed on the hinged side of the second door body 2, and the stopper is being in contact engagement with the involute surface. The drive portion 29 can also be a baffle plate or other structural forms.

According to embodiments of the present application, in order to ensure reliable engagement between the drive portion 29 and the cam hinge 28, referring to FIG. 17, a second elastic reset member 30 is provided between the first door body 1 and the second door body 2. In an embodiment, along a moving direction of the second door body 2 with respect to the first door body 1, both ends of the second elastic reset member 30 are respectively connected to the first door body 1 and the second door body 2. When the door leaf is switched from the closing state to the opening state, the distance between the axis of the cam hinge 28 and the drive portion 29 gradually decreases under the action of the restoring force of the second elastic reset member 30. When the door leaf is switched from the opening state to the closing state, the drive portion 29 abuts against the cam 281 at different positions, and the distance between the axis of the cam hinge 28 and the drive portion 29 is gradually increased. During this process, the second elastic reset member is gradually deformed until the distance between the shaft center and the drive portion 29 reaches a maximum distance value.

According to an embodiment of the present application, the cam hinge 28 does not necessarily include the cam 281. For example, the cam hinge 28 may also be provided with an involute groove, and the drive portion 29 includes a drive rod that can move along the involute groove, and can also change the distance between the axis of the cam hinge 28 and the drive rod during the rotation of the door leaf through the engagement between the involute groove and the drive rod.

According to an embodiment of the present application, in addition to providing the second elastic reset member 30 to ensure that the cam hinge 28 is always engaged with the drive portion 29 during the opening and closing of the door leaf, it can be ensured that the cam hinge 28 contacts always the drive portion 29 by the acting force of the magnetic field, or by the aforementioned engagement between the involute groove and the drive rod.

According to an embodiment of the present application, an elastic sealing layer (not shown in the figure) may be provided on the opening side of the second door body 2. Especially when the second door body is moved with respect to the first door body 1 through the engagement between the above-mentioned cam hinge 28 and the drive portion 29, even if the seam 24 is zero in the closing state of the door leaf, the arrangement of the elastic sealing layer can also make normal opening and closing of the door leaf easier. In an embodiment, assuming that the seam 24 on the opening side of the door leaf is zero or approximately zero when the door leaf is in the closing state, it will cause the door to fail to open if the opening side of the second door body 2 is rigid. Through the arrangement of the elastic sealing layer, the door leaf can be opened by the deformation of the elastic sealing layer. As the opening angle increases, it is gradually easier to open the door leaf through the engagement between the cam hinge 28 and the drive portion 29. Conversely, the process of closing the door leaf has the same principle. The structure of the elastic sealing layer may correspond to the structure of a side plate on the opening side of the second door body 2, that is, the size of the elastic sealing layer is basically the same as that of the side plate on the opening side of the second door body 2.

In addition, when the second door body 2 moves with respect to the first door body 1 under the action of the drive member 25, since the second door body 2 can be driven by the drive member 25 to move to the avoidance position before the opening and closing of the door leaf, even if no elastic sealing layer is provided, it is easy to normally open and close the door leaf.

According to an embodiment of the present application, the second door body 2 makes linear motion with respect to the first door body 1. In order to guide the movement of the second door body 2, linear guide structures engaged with each other can be disposed between the first door body 1 and the second door body 2, and the number and arrangement position of the linear guide structures are not limited. For example, a sliding rail 3 and a sliding block 4 may be disposed between the first door body 1 and the second door body 2. As long as the second door body 2 can move with respect to the first door body 1 to its opening side or its hinged side, the second door body 2 can also move with respect to the first door body 1 in other forms.

According to an embodiment of the present application, the first elastic reset member 6, the second elastic reset member 30 and the elastic telescopic member 703 mentioned above can all be, but not limited to, the structural form of a spring, as long as the corresponding restoring or telescopic effect can be provided.

According to an embodiment of the second aspect of the present application, refrigeration equipment is provided, which includes a box body, and further includes the above-mentioned door assembly, where the door assembly is installed at an opening of the box body.

According to the refrigeration equipment of embodiments of the present application, the second door body 2 of the door assembly can move with respect to the first door body 1 since the above-mentioned door assembly is provided. When the second door body 2 moves to the sealing position, the sealing performance of the refrigeration equipment can be ensured, thereby preventing cold air of the refrigeration equipment from leaking. In addition, when the second door body 2 is in the sealing position, the seam 24 on the opening side of the door leaf is zero or approximately zero, thereby ensuring the appearance of the refrigeration equipment. When the second door body 2 moves to the avoidance position, the normal opening and closing of the door assembly can be ensured, so as to ensure the normal application of the refrigeration equipment.

According to an embodiment of the present application, the refrigeration equipment may be a refrigerator, a freezer, a heating cabinet, and the like.

According to an embodiment of the present application, referring to FIG. 24 to FIG. 25, the refrigeration equipment is a refrigerator, a refrigerating chamber and a freezing chamber located below the refrigerating chamber are disposed in the box body of the refrigerator. In the case that the door assembly is a side-by-side door assembly, the opposite-door assembly is provided corresponding to the refrigerating chamber and the freezing chamber; the freezing chamber is provided with a freezing drawer, and a drawer panel of the freezing drawer is sealed with a box tank of the refrigeration equipment in a closed position of the freezing drawer.

Since a sealing is formed between the drawer panel of the freezing drawer and the box tank of the refrigeration equipment, the position of the door assembly corresponding to the freezing chamber can also be set thinner than a traditional freezing door leaf at this time.

Figure 24:
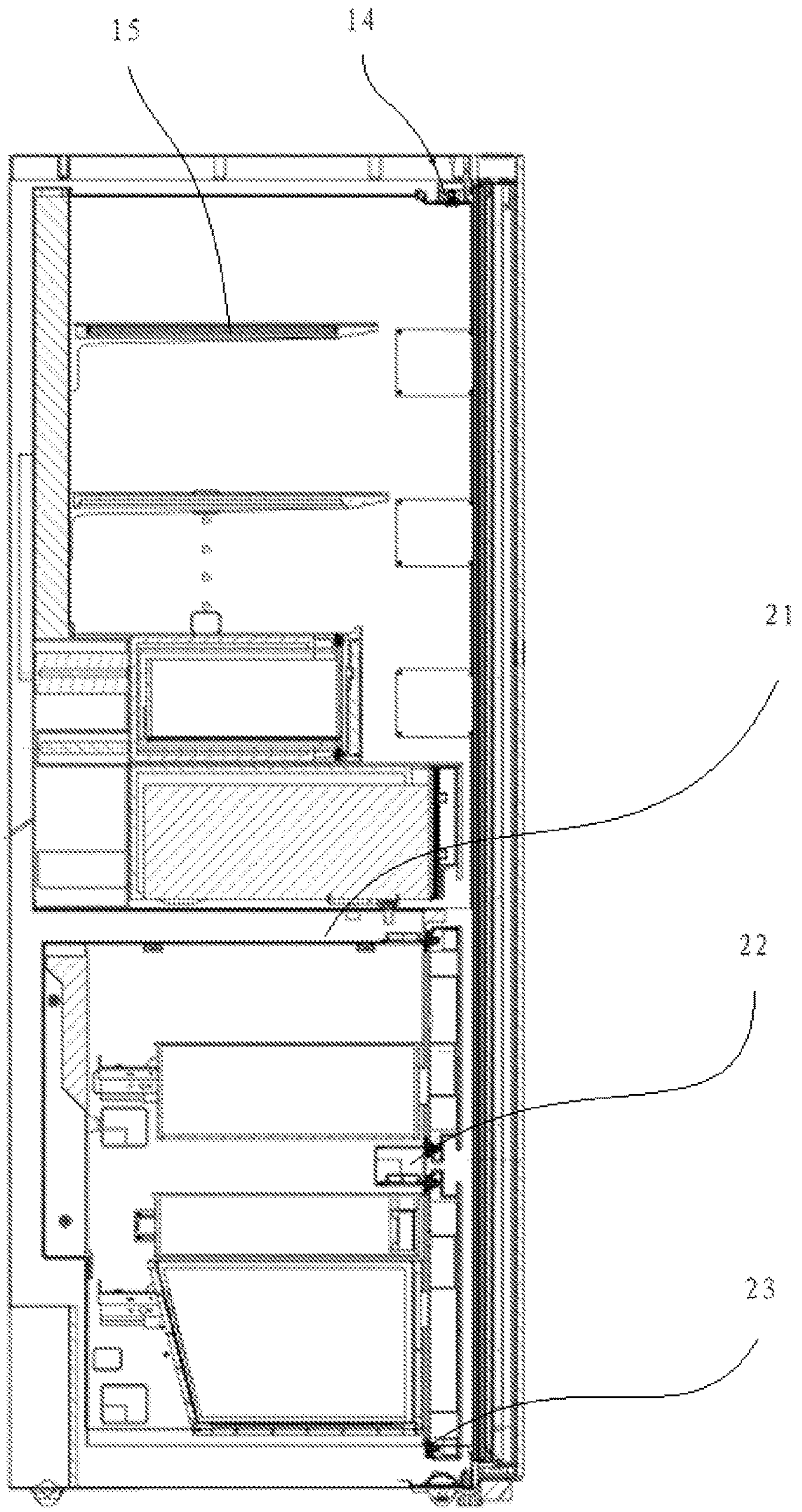
FIG. 24 is a cross-sectional view of a French-door refrigerator according to an embodiment of the present application.
Figure 25:
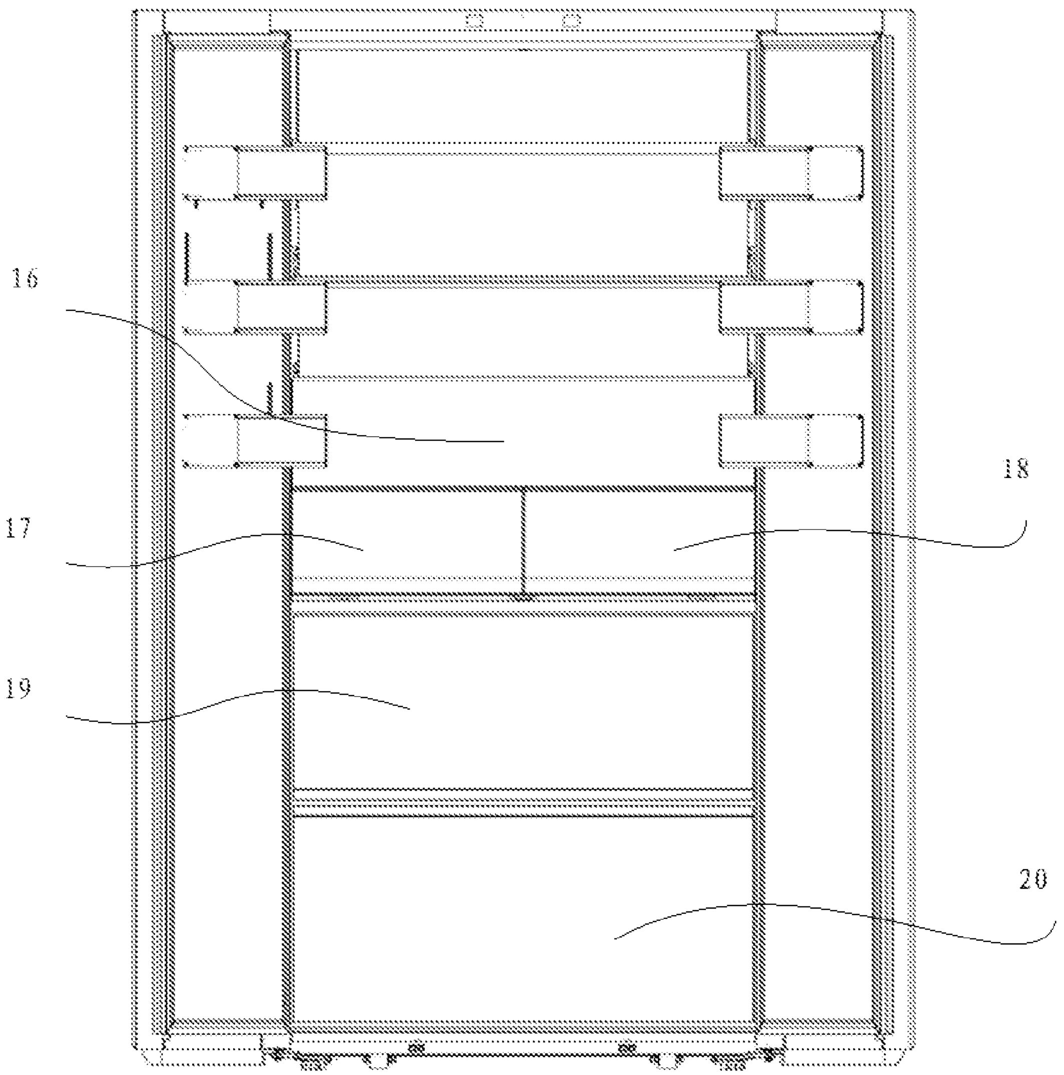
FIG. 25 is a front view of a French-door refrigerator according to an embodiment of the present application.

In FIG. 24 to FIG. 25, the door assembly includes a left door leaf and a right door leaf. The middle partition plate 21 divides the space inside the box body of the refrigerator into a refrigerating space and a freezing space. A camera assembly 14, an electrically lifting shelf 15, a fruit and vegetable drawer 16, a lower left drawer 17 and a lower right drawer 18 are installed correspondingly in the refrigerated space. The two freezing drawers are correspondingly provided with an upper freezing panel 19 and a lower freezing panel 20, and a false middle beam 22 is provided between the two freezing drawers, and a lower beam 23 is provided at a bottom of the freezing drawer. The upper freezing panel 19, the lower freezing panel 20, the middle partition plate 21, the false middle beam 22, the lower beam 23 and the box body form a closed freezing space, which prevents the cold air in the freezing space from leaking into the refrigerating space and a space between the left door leaf and the right door leaf.

Specific embodiments of the present application will be described below with reference to FIG. 5 to FIG. 25.

Referring to FIG. 5 to FIG. 12, the door assembly is a side-by-side door assembly, including a left door leaf and a right door leaf. The left door leaf and the right door leaf respectively include an outer door body and an inner door body, and further include an outer door body door seal 201. A plurality of first electromagnets 5 are respectively provided on the opening sides of the left door leaf and the right door leaf. In an embodiment, an inner door body of the left door leaf and an inner door body of the right door leaf are respectively provided with a plurality of first electromagnets 5, and iron blocks are provided on the outer door body corresponding to the first electromagnets 5. In addition, a spring serving as a first elastic reset member 6 is provided near the first electromagnet 5, the first end of the spring is fixedly connected to the inner door body, and the second end of the spring abuts the outer door body. Along the height direction of the door leaf (referring to at least one of the left door leaf and the right door leaf), there is a plurality of the first elastic reset members 6 and the springs.

When the state of the door leaves needs to be switched, the first electromagnet 5 is activated, and then the first electromagnet 5 generates a repulsive force on the iron block, so that the outer door body moves toward the hinged side of the inner door body, thereby making the gap between the two door leaves change from zero to a preset gap. The opening of the two door leaves is not interfered.

Figure 8:
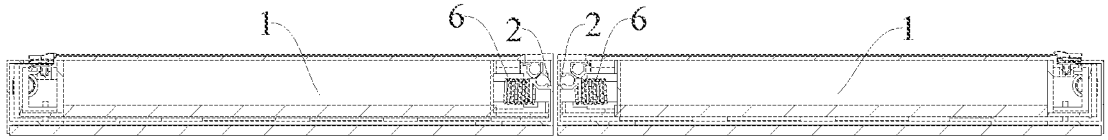
FIG. 8 is a cross-sectional view of a door assembly according to an embodiment of the present application, where a second door body is in an avoidance position.
Figure 9:
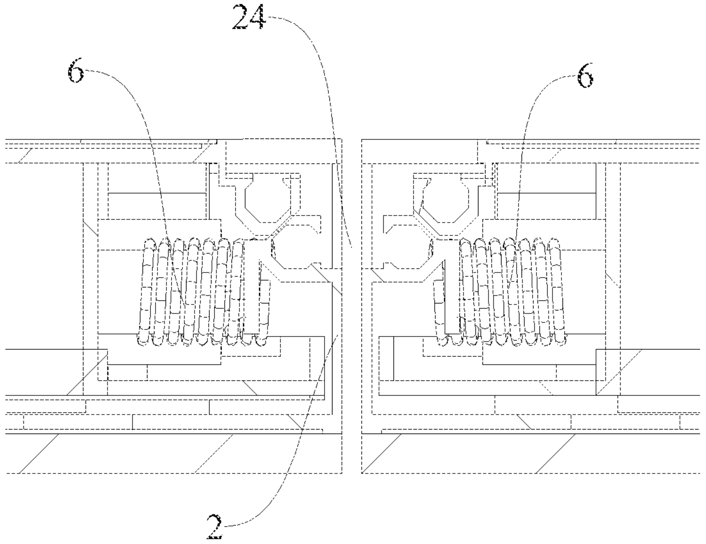
FIG. 9 is a partial enlarged view of an opening side of a door leaf in FIG. 8.
Figure 10:
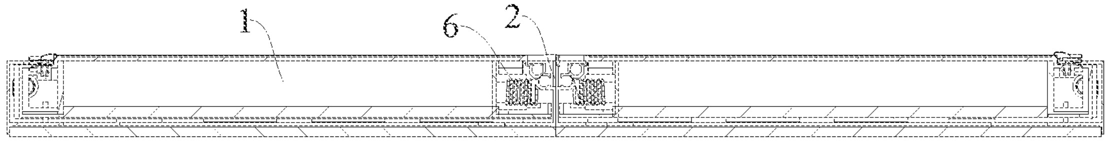
FIG. 10 is a cross-sectional view of a door assembly according to an embodiment of the present application, where a second door body is in a sealing position.
Figure 11:
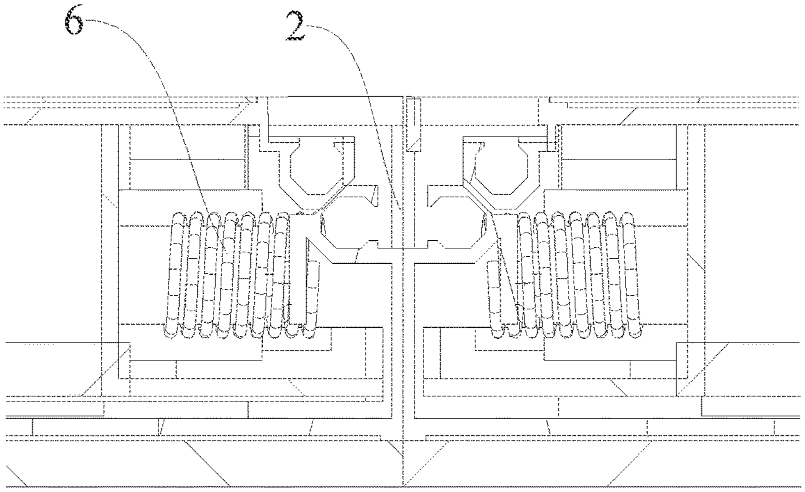
FIG. 11 is a partial enlarged view of an opening side of a door leaf in FIG. 10.

Referring to FIG. 8 and FIG. 9, when the door leaf is just closed, the first electromagnet 5 stops working, and there is still a seam 24 between the left door leaf and the right door leaf After that, referring to FIG. 10 and FIG. 11, the outer door bodies of the left door leaf and the right door leaf move relatively under the rebound force of the spring, so that the seam 24 between the two door leaves is zero or approximately zero.

In the process of reducing the seam 24 between the two door leaves, for each door leaf, its outer door body moves toward the opening side of the inner door body, so that the width of the passage 8 formed between the opening side of the outer door body and the opening side of the inner door body becomes larger. The passage includes a curved segment 801 and straight segment 802 located at both ends of the curved segment, and the straight segment 802 on both sides of the curved segment 801 are provided with heat-insulation airbags 9. As the outer door body moves toward the opening side of the inner door body, the heat-insulation airbag 9 is stretched. On the contrary, when the seam 24 between the two door leaves increases, for each door leaf, outer door body of each door leaf moves toward the hinged side of the inner door body, so that the width of the passage 8 formed between the opening side of the outer door body and the opening side of the inner door body becomes smaller. As the outer door body moves toward the hinged side of the inner door body, the heat-insulation airbag 9 is compressed. When the heat-insulation airbag 9 is compressed, its size along the thickness direction of the door leaf is smaller than the dimension of the straight line segment 802 to ensure the installation of the heat-insulation airbag 9. In addition, the heating member 10 is installed on the outer surface of the passage 8, so that the installation of the heating member 10 and the heat-insulation airbag 9 will not interfere with each other, and the heating member 10 will have no damage to the heat-insulation airbag 9.

In order to guide the movement of the outer door body, a sliding rail 3 and a sliding block 4 are disposed between the outer door body and the inner door body of the door leaf. In an embodiment, sliding rails 3 and sliding blocks 4 are disposed at the upper and lower ends of the outer door body and the inner door body, respectively to ensure that the outer door body moves along a straight line.

The above embodiments are only used to illustrate the present application, but not to limit the present application. Although the present application has been described in detail with reference to the example embodiments, those of ordinary skill in the art should understand that various combinations, modifications or equivalent replacements to the solutions of the present application will not depart from the scope of the solutions of the present application, and should cover within the scope of the claims of this application.

The invention claimed is:

1. A door assembly, comprising:

a door leaf, comprising a first door body and a second door body, wherein the first door body is configured to be rotatably connected to a mounting part, and the second door body is configured to move toward an opening side or a hinged side of the first door body to switch between a sealing position and an avoidance position;

wherein the door leaf is configured to switch between a closing state in which the second door body is in the sealing position and an opening state, and the second door body is in the avoidance position when the door leaf is switching between the closing state and the opening state, wherein the first door body is configured to be connected to the mounting part through a cam hinge, and the second door body is provided with a drive portion being in contact engagement with the cam hinge;

wherein during the switching of the door leaf from the closing state to the opening state, the drive portion rotates with respect to the cam hinge and a distance between the drive portion and an axis of the cam hinge becomes smaller, and the second door body moves toward the hinged side of the first door body with respect to the first door body.

2. The door assembly of claim 1, comprising a drive member provided between the first door body and the second door body, the drive member configured to drive the second door body to move toward the opening side or the hinged side of the first door body.

3. The door assembly of claim 2, wherein the drive member comprises a rotary motor installed on the first door body, the first door body is provided with a screw rod, the second door body is provided with a nut, and an output shaft of the rotary motor is connected to the screw rod to drive the nut to make linear motion along the screw rod; or wherein the drive member comprises a linear motor installed on the first door body, the first door body is provided with a sliding rail, the second door body is provided with a sliding block, and an output shaft of the linear motor is connected to the sliding block to drive the sliding block to make linear motion along the sliding rail.

4. The door assembly of claim 2, wherein the drive member comprises a first electromagnet provided on at least one of the first door body or the second door body, the first electromagnet including a power-on state and a power-off state, wherein in the power-on state a magnetic field is generated in the first electromagnet and the second door body is switched between the sealing position and the avoidance position under an action of the magnetic field.

5. The door assembly of claim 2, wherein the door assembly is a side-by-side door assembly, and the door leaf comprises oppositely arranged side-by-side door leaves each including a second body;

the drive member comprises a second electromagnet provided on an opening side of each of the second door bodies of the side-by-side door leaves, and the second electromagnet includes a power-on state and a power-off state;

wherein the second electromagnets of the oppositely arranged side-by-side door leaves interact with each other in the power-on state and second door bodies of the oppositely arranged side-by-side door leaves move towards each other or away from each other.

6. The door assembly of claim 2, comprising a first elastic reset member connected between the second door body and the first door body;

wherein the drive member drives the second door body to move to the avoidance position during the switching of the door leaf between the closing state and the opening state, and in the closing state, the first elastic reset member drives the second door body to move to the sealing position; or wherein in the closing state, the drive member drives the second door body to move to the sealing position, and the first elastic reset member drives the second door body to move to the avoidance position during the switching of the door leaf between the closing state and the opening state.

7. The door assembly of claim 1, further comprising:

a second elastic reset member, connected between the first door body and the second door body along a moving direction of the second door body with respect to the first door body, wherein in the closing state, the distance reaches a first distance value, and the second elastic reset member is deformed, and the distance gradually decreases under the action of a restoring force of the second elastic reset member during the switching of the door leaf from the closing state to the opening state.

8. The door assembly of claim 1, wherein the cam hinge comprises a hinge shaft and a cam fixed to the hinge shaft, and the cam includes an involute surface engaged with the drive portion.

9. The door assembly of claim 8, wherein the drive portion is a stopper fixed on a hinged side of the second door body, and the stopper is in contact engagement with the involute surface.

10. The door assembly of claim 1, wherein the first door body is located in the second door body, and a passage extending along a thickness direction of the door leaf is formed between the opening side of the first door body and the opening side of the second door body.

11. The door assembly of claim 10, further comprising:

heat-insulation airbags, provided in the passage along a moving direction of the second door body with respect to the first door body, wherein a first end of each of the heat-insulation airbags is connected to the first door body, and a second end of each of the heat-insulation airbags is connected to the second door body;

wherein the heat-insulation airbag is stretched in the closing state, and the heat-insulation airbag is compressed during the switching of the door leaf between the closing state and the opening state.

12. The door assembly of claim 10, wherein the passage extends along the thickness direction of the door leaf and comprises a curved segment, and the passage becomes wider as the second door body moves toward the opening side of the first door body and becomes narrower as the second door body moves toward the hinged side of the first door body.

13. The door assembly of claim 12, comprising a groove and a protrusion engaged with each other and disposed between the second door body and the first door body, wherein the curved segment is disposed between the groove and the protrusion.

14. The door assembly of claim 13, comprising heat-insulation foam inside the protrusion.

15. The door assembly of claim 12, wherein the passage further comprises straight segments located at both ends of the curved segment.

16. The door assembly of claim 10, comprising a heating member in the passage.

17. The door assembly of claim 1, wherein the door assembly is a side-by-side door assembly, and the door leaf comprises oppositely arranged side-by-side door leaves, wherein the door assembly further comprises a door seal assembly on an opening side of each of the side-by-side door leaves, and wherein the door seal assembly comprises an oppositely sucked side door seal extending along a thickness direction of the side-by-side leaf and a main door seal extending along a width direction of the side-by-side leaf, and the oppositely sucked side door seal and the main door seal are connected through an elastic telescopic member.

18. The door assembly of claim 17, wherein the door seal assembly is installed at a corner of the side-by-side leaf, and the oppositely sucked side door seal is provided close to an inner surface of the side-by-side leaf.

19. The door assembly of claim 17, wherein both the oppositely sucked side door seal and the main door seal are provided with barbs, the barb of the oppositely sucked side door seal is installed on an outer door body, and the barb of the main door seal is installed on an inner door body.

20. A door assembly, comprising:

a door leaf, comprising a first door body and a second door body, wherein the first door body is configured to be rotatably connected to a mounting part, and the second door body is configured to move laterally toward an opening side or a hinged side of the first door body to switch between a sealing position and an avoidance position;

wherein the door leaf is configured to switch between a closing state in which the second door body is in the sealing position and an opening state, and the second door body is in the avoidance position when the door leaf is switching between the closing state and the opening state, wherein the first door body is located in the second door body, and a passage extending along a thickness direction of the door leaf is formed between the opening side of the first door body and the opening side of the second door body.

* * * * *